United States Patent [19]

Carlson et al.

[11] Patent Number: 4,539,338

[45] Date of Patent: Sep. 3, 1985

[54] PHENOL FORMALDEHYDE RESOLES FOR MAKING PHENOLIC FOAM

[75] Inventors: John D. Carlson, Homosassa, Fla.; Edward W. Kifer, Trafford, Pa.; Vincent J. Wojtyna, Lyndora, Pa.; James P. Colton, Monroeville, Pa.

[73] Assignee: Koppers Company, Inc., Pittsburgh, Pa.

[21] Appl. No.: 634,197

[22] Filed: Jul. 27, 1984

Related U.S. Application Data

[63] Continuation of Ser. No. 396,500, Jul. 9, 1982, abandoned, which is a continuation-in-part of Ser. No. 282,021, Jul. 10, 1981, abandoned.

[51] Int. Cl.$^3$ ................................................ C08J 9/14
[52] U.S. Cl. .................................... 521/131; 521/133; 521/181
[58] Field of Search ......................... 521/133, 181, 131

[56] References Cited

U.S. PATENT DOCUMENTS

| | | | |
|---|---|---|---|
| 2,446,429 | 8/1948 | Nelson et al. | 521/117 |
| 2,653,139 | 9/1953 | Sterling | 521/106 |
| 2,728,741 | 12/1955 | Simon | 525/58 |
| 2,933,461 | 4/1960 | Mullen | 521/117 |
| 2,979,469 | 4/1961 | Shannon et al. | 521/116 |
| 3,271,331 | 9/1966 | Ender | 521/112 |
| 3,298,973 | 1/1967 | Quarles et al. | 521/103 |
| 3,336,243 | 8/1967 | Garrett | 521/88 |
| 3,389,094 | 6/1968 | D'Alessandro | 521/114 |
| 3,389,095 | 6/1968 | Garrett | 521/53 |
| 3,484,391 | 12/1969 | Wheatley et al. | 521/181 |
| 3,639,303 | 6/1968 | Penfold | 521/181 |
| 3,640,911 | 2/1972 | Papa et al. | 521/181 |
| 3,673,130 | 6/1972 | Papa et al. | 521/107 |
| 3,692,706 | 9/1972 | Graham et al. | 521/106 |
| 3,694,387 | 9/1972 | Junger et al. | 521/103 |
| 3,726,708 | 4/1973 | Weissenfels et al. | 428/320.2 |
| 3,740,358 | 6/1973 | Christie et al. | 521/103 |
| 3,741,920 | 6/1973 | Weissenfels et al. | 521/116 |
| 3,821,337 | 6/1974 | Bunclark et al. | 264/26 |
| 3,830,894 | 8/1974 | Juenger et al. | 264/41 |
| 3,835,208 | 9/1974 | Koutitonsky | 264/45.5 |
| 3,842,020 | 10/1974 | Garrett | 521/54 |
| 3,862,912 | 1/1975 | Berndt et al. | 521/88 |
| 3,870,661 | 3/1975 | Crook et al. | 521/110 |
| 3,872,033 | 3/1975 | Boden et al. | 521/181 |

(List continued on next page.)

FOREIGN PATENT DOCUMENTS

| | | |
|---|---|---|
| 674181 | 11/1963 | Canada . |
| 866876 | 3/1971 | Canada . |
| 1026068 | 3/1978 | Canada . |
| 1272857 | 5/1972 | United Kingdom . |
| 1275871 | 6/1972 | United Kingdom . |
| 1414506 | 11/1975 | United Kingdom . |
| 1488527 | 10/1977 | United Kingdom . |
| 1566109 | 6/1980 | United Kingdom . |

Primary Examiner—Morton Foelak
Attorney, Agent, or Firm—Herbert J. Zeh, Jr.

[57] ABSTRACT

The present invention is directed to aqueous phenol formaldehyde resoles that have particular application in manufacturing phenolic foam insulation. The resoles are essentially phenol formaldehyde condensation polymers having molar ratios of formaldehyde to phenol of from about 1.7:1 to 2.3:1, preferably from 1.75:1 to 2.25:1 and most preferably about 2:1. The resoles have a weight average molecular weight greater than 800 and preferably from 950-1500. The resoles also have a number average molecular weight greater than 350 and preferably from about 400 to about 600 and a dispersivity greater than about 1.7, preferably from 1.8 to 2.6. Phenol formaldehyde resoles having these characteristics are processable into phenolic foams having a low k value and having other physical characteristics which make the phenolic foam especially useful as an insulation material. The present invention is also directed to foamable phenolic resole compositions prepared from the phenolic resoles and phenolic foams prepared from the compositions.

30 Claims, 23 Drawing Figures

U.S. PATENT DOCUMENTS

| | | | |
|---|---|---|---|
| 3,876,620 | 4/1975 | Moss | 528/155 |
| 3,877,967 | 4/1975 | Junger et al. | 428/318.4 |
| 3,885,010 | 5/1975 | Bruning et al. | 264/46.2 |
| 3,907,723 | 9/1975 | Pretot | 521/112 |
| 3,915,772 | 10/1975 | Weissenfels et al. | 156/79 |
| 3,953,645 | 4/1976 | Moss | 428/304.4 |
| 3,968,300 | 7/1976 | Moss et al. | 428/304.4 |
| 3,998,765 | 12/1976 | Novak et al. | 521/121 |
| 3,999,230 | 12/1976 | Bruning et al. | 425/149 |
| 4,001,148 | 1/1977 | Simic et al. | 521/106 |
| 4,018,725 | 4/1977 | Hadley | 521/131 |
| 4,033,909 | 7/1977 | Papa | 521/131 |
| 4,033,910 | 7/1977 | Papa | 521/131 |
| 4,036,793 | 7/1977 | Moss | 264/45.5 |
| 4,042,314 | 8/1977 | Bruning et al. | 425/89 |
| 4,048,145 | 9/1977 | Moss | 528/155 |
| 4,067,829 | 1/1978 | Garrett | 521/91 |
| 4,070,313 | 1/1978 | Papa | 521/110 |
| 4,102,832 | 7/1978 | Weissenfels et al. | 521/103 |
| 4,107,107 | 8/1978 | Mendelsohn et al. | 521/106 |
| 4,111,911 | 9/1978 | Weissenfels et al. | 251/175 |
| 4,119,584 | 10/1978 | Papa et al. | 521/127 |
| 4,122,045 | 10/1978 | Garrett et al. | 521/103 |
| 4,133,931 | 1/1979 | Beale et al. | 428/305.5 |
| 4,140,842 | 2/1979 | Beale et al. | 521/129 |
| 4,165,413 | 8/1979 | Sefton et al. | 521/128 |
| 4,166,162 | 8/1979 | Weissenfels et al. | 521/100 |
| 4,176,106 | 11/1979 | Reid et al. | 524/843 |
| 4,176,216 | 11/1979 | Reid et al. | 521/106 |
| 4,202,945 | 5/1980 | Leinhardt | 521/121 |
| 4,204,020 | 5/1980 | Beale et al. | 428/314.8 |
| 4,205,135 | 5/1980 | Beale et al. | 521/116 |
| 4,207,400 | 6/1980 | Dahms | 521/112 |
| 4,207,401 | 6/1980 | Dahms | 521/112 |
| 4,216,295 | 8/1980 | Dahms | 521/112 |
| 4,219,623 | 8/1980 | Sudan et al. | 521/85 |
| 4,225,679 | 9/1980 | Pilato | 71/68 |
| 4,252,908 | 2/1981 | Paladini | 521/117 |
| 4,272,403 | 6/1981 | Meyer et al. | 502/168 |
| 4,303,758 | 12/1981 | Gussmer | 521/121 |
| 4,323,667 | 4/1982 | Meyer et al. | 528/138 |
| 4,332,754 | 6/1982 | Meunier et al. | 521/110 |

PHENOL FORMALDEHYDE RESOLES FOR MAKING PHENOLIC FOAM

CROSS-REFERENCE TO RELATED APPLICATIONS

This application is a continuation of application Ser. No. 396,500, filed July 9, 1982, now abandoned, which is a continuation-in-part of U.S. application Ser. No. 282,021, filed July 10, 1981, now abandoned.

BACKGROUND OF THE INVENTION

1. Field of the Invention

The present invention is directed to particular aqueous phenol formaldehyde resoles that are produced by the base catalyzed condensation of phenol and formaldehyde. These phenolic resoles are especially useful in preparing phenolic foams having both a low k value and excellent fire properties, compressive strength, density, friability and other properties necessary for insulation board. The invention is also directed to foamable phenolic resole compositions prepared using the aqueous phenolic resoles and phenolic foams made from the compositions.

2. Prior Art

Phenolic foams prepared from phenol formaldehyde resoles have been known for many years. It is generally agreed that phenolic foams have the best fire rating of any known foam insulation. Phenolic foams do not burn even when contacted by the flame of a blow torch and give off minimal amounts of toxic gases. Phenolic foams can stand temperatures of 375° F. without serious degradation. Phenolic foams have an ASTM E-84 Steiner Tunnel Flame Spread Rating of about 5, a Fuel Contribution of about 0 and a Smoke Rating of about 5.

Despite these advantages and generally favorable economics, phenolic foams have not heretofore penetrated the thermal insulation market. One of the main reasons phenolic foams have not been successful is that phenolic foams made heretofore have exhibited an unsatisfactory initial thermal conductivity or an undesirable increase in thermal conductivity over time. Additionally, the compressive strength of prior art phenolic foams is not as high as desirable for normal handling. It has also been reported that prior art phenolic foams have serious problems with friability and punking.

The general composition and method for preparing phenolic foam are well known. Generally, a foamable phenolic resole composition is prepared by admixing an aqueous phenol formaldehyde resole, a blowing agent, a surfactant, optional additives and an acid curing agent into a substantially uniform mixture. The curing catalyst is added in amounts sufficient to initiate the curing reaction which is highly exothermic. The exotherm of the curing reaction vaporizes and expands the blowing agent thereby foaming the composition. The foaming process is preferably performed in a closed mold.

The general method for the continuous manufacture of phenolic foam insulation board is as follows. The foamable phenolic resole composition is prepared by continuously feeding into a suitable mixing device the aqueous phenol formaldehyde resole, the blowing agent, the surfactant, the optional additives, and the acid curing catalyst. The ratio of these ingredients is varied depending on the density, thickness, etc. desired in the final product. The mixing device combines these ingredients into a substantially uniform mixture which is continuously applied evenly onto a moving substrate, usually a protective covering such as cardboard which adheres to the foam. The foaming composition is usually covered with another protective covering such as cardboard which becomes adhered to the phenolic foam. The covered foaming composition is then passed into a double belt press type apparatus where the curing exotherm continues to vaporize and expand the blowing agent, thereby foaming the composition as it is cured.

As mentioned herein, one of the main drawbacks of prior art phenolic foams is an unsatisfactory initial thermal conductivity (k value). It is believed that one of the main causes of phenolic foam having a poor initial thermal conductivity is due to the rupturing of the cell walls during the foaming and early curing of the foamable phenolic resole composition. This rupturing causes an immediate loss of the blowing agent which results in a poor initial thermal conductivity. Ruptured cell walls also provide ready passage of water into the foam causing further increase in thermal conductivity. It is also believed that ruptured cell walls deleteriously affect the compressive strength and other properties of the phenolic foam. Another main cause of initial poor thermal conductivity in phenolic foams is the loss of blowing agent before the cell walls are sufficiently formed to entrap the blowing agent.

Also as mentioned herein, another drawback of the prior art phenolic foam is the undesirable increase of thermal conductivity over time (k factor drift). Even in those prior art phenolic foams which have cell walls which are not ruptured and which have blowing agent entrapped therein, the foams have a tendency to lose the blowing agent over time with a corresponding increase in thermal conductivity. It is believed that there are two main causes to an increase in thermal conductivity over time. The first is the presence of small perforations or pinholes in the cell walls including the struts that are formed where cell walls are joined together. These small perforations allow the blowing agent to diffuse out over time and be replaced by air. This slow replacement of the blowing agent with air causes an increase in thermal conductivity and loss of thermal insulation value. The small perforations also allow the phenolic foam to absorb water, thereby further increasing the thermal conductivity. It is believed that the perforations are caused by water that is present in certain parts of the foamable phenolic resole conposition, particularly the catalyst. A method for over-coming perforations in the cell walls and struts using certain anhydrous aryl sulfonic acid catalysts is the subject matter of a copending application.

The other main cause of the loss of thermal conductivity over time is cracking of the cell walls. In many of the prior art phenolic foams, the cell walls are very thin. When phenolic foam having thin walls are subject to high temperatures, the cell walls dry out and crack. Also, thermal insulation is quite often subject to heating and cooling cycles with related expansion and contraction. The expansion and contraction of the thin cell walls also causes cracking. Cracking of the thin cell walls allows the blowing agent to leak out over time with an increase in thermal conductivity and with a loss of thermal insulation value.

The art has proposed several methods for overcoming the problem of poor thermal conductivity. For example, one method involves a two-step process comprising foaming the foamable phenolic resole composition initially under a vacuum followed by curing at high temperatures and low pressures. This method does produce a foam having a substantial number of cell walls which are not ruptured; however, there are still many cell walls which are either ruptured or which are thin and readily crack when subjected to thermal stress. This method is also not commercially desirable because of the equipment that is necessary and the extended time that is required. Another method involves foaming and curing the foamable phenolic resole at low temperatures (i.e., less than 150° F.). This method also reduces the number of cell walls that are ruptured but the resulting phenolic foam still has thin cell walls. Another method covered by a copending application assigned to the same assignee covers a method of foaming and curing the foamable phenolic resin composition while maintaining pressure on the foaming and curing composition. This method greatly reduces the number of ruptured cell walls but the resultant phenolic foam may still have a substantial number of ruptured cell walls or may have lost the blowing agent before the cell walls were cured, and also, the cell walls may be thin.

Other attempts at improving the thermal conductivity of phenolic foams has been based on developing specially modified phenolic resoles, or surfactants, or the use of certain additives in the foamable phenolic resole composition. None of these methods has been commercially successful. See, for example, U.S. Pat. Nos. D'Allesandro 3,389,094; Bunclark et al. 3,821,337; Moss et al. 3,968,300; Moss 3,876,620; Papa 4,033,910; Beale et al. 4,133,931; Bruning et al. 3,885,010; and Gusmer 4,303,758.

In accordance with the present invention, it has been found that the rupturing of cell walls during foaming, the loss of blowing agent before the cell walls are sufficiently formed to entrap the blowing agent, and the formation of thin cell walls is directly related to the phenolic resole used in making the phenolic foam.

Accordingly, it is an object of the present invention to provide an improved aqueous phenolic resole that yields phenolic foam having cell walls that are substantially free of ruptures.

Another object of the present invention is to provide an improved aqueous phenolic resole that yields phenolic foam that does not lose the blowing agent before the cell walls are sufficiently formed to entrap the blowing agent.

A still further object of the present invention is to provide an aqueous phenolic resole that yields phenolic foams having cell walls that are not subject to cracking because of drying or expansion and contraction.

Additional objects and advantages of the present invention will be apparent to those skilled in the art by reference to the following description and drawings.

SUMMARY OF THE INVENTION

The present invention comprises an aqueous phenol formaldehyde resole that is useful in preparing phenolic foam insulation having good thermal insulation properties, compressive strength, density, friability and other properties necessary for commercial application. The aqueous phenol formaldehyde resole is essentially a phenol formaldehyde condensation polymer having a molar ratio of formaldehyde to phenol of from about 1.7:1 to about 2.3:1, preferably from about 1.75:1 to about 2.25:1 and most preferably about 2:1. The phenolic resole has a weight average molecular weight as determined by gel permeation chromatography (GPC) of at least about 800 and preferably from about 950-1500. The resole also has a number average molecular weight as detenmined by GPC of at least about 350 and preferably from about 400 to about 600 and a dispersivity greater than about 1.7, preferably from about 1.8 to 2.6. Phenol formaldehyde resoles having these properties can be processed on a consistent and repeatable basis into phenolic foams having initial k values of 0.10 to 0.13, compressive strengths of 20 to 35 psi and densities of from 1.5 to 5.0 pounds per cubic foot. The foam also has excellent fire ratings.

The improved aqueous phenol formaldehyde resole can be produced using any of the standard procedures known for making aqueous phenolic resoles. The preferred method for preparing the aqueous phenolic resoles comprises reacting highly concentrated aqueous phenol (>88% by weight) with highly concentrated formaldehyde (>85% by weight) in the presence of an alkaline catalyst in a concentration slightly higher than those normally employed in preparing phenolic resoles. In the preferred method, the formaldehyde is added serially or continuously during the first part of the condensation reaction to mixture of the phenol and the alkaline catalyst.

The improved aqueous phenol formaldehyde resoles are formulated into foamable phenolic resole compositions containing in addition to the aqueous phenolic resole, surfactant, blowing agent, optional additives and an acid foaming and curing catalyst. The foamable phenolic resole compositions yield phenolic foam having improved characteristics, especially thermal insulation properties, when compared to prior art phenolic foams.

BRIEF DESCRIPTION OF THE DRAWINGS

Like numerals refer to like parts in the following drawings.

DETAILED DESCRIPTION OF THE INVENTION

Figure 1A:
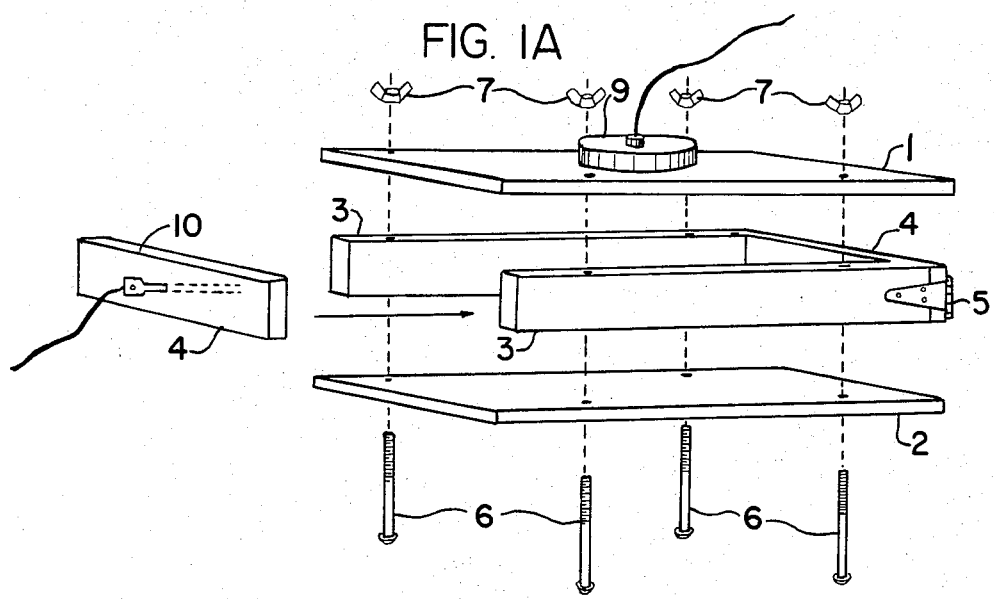
FIGS. 1A and 1B illustrate diagrammatically in partial cross sections substantially closed molds used in making phenolic foam in the laboratory.

As mentioned above, the use of phenolic foams for thermal insulation applications, particularly for roofs, walls and pipes, is highly desirable because of the excellent fire properties that are inherent in phenolic foams. However, phenolic foams heretofore known suffer from generally unacceptable initial k factors and their inability to retain a low k factor over time. The thermal insulating ability of a foamed material generally may be evaluated by the thermal conductivity or k factor. The thermal conductivity or k factor of a particular insulation material is measured according to ASTM Method C-518 Revised and is typically expressed dimensionally as BTU per inch per hour per square foot per °F. The lower the k factor, the better is the insulating quality of the material. Additionally, the longer the foam can retain a low k factor, the better is the insulating efficiency of the material.

A low k factor is understood to mean a k factor substantially below about 0.22, which is approximately the k factor of air. An initially low k factor is understood to mean a k factor of substantially below 0.22 when measured after the foam that is initially produced comes to an equilibrium water content, generally within about five days. It has been found that phenolic foam can be prepared with the phenolic resoles of the present invention that have k factors that decrease during the first several days as the water content of the phenolic foam comes to equilibrium with the environment. Thereafter, the k factor remains substantially constant over time. Phenolic foams can be prepared with the resoles of the present invention that have initial k factors measured according to the ASTM method of less than 0.15 and generally in the range of 0.10 to 0.13. Some of the foams prepared with the preferred phenolic resoles have had k factors less than 0.10 when measured at very low water contents. Phenolic foam can be prepared which retain these low k factors over time.

Phenolic foams prepared from the phenolic resoles of the invention generally have overall densities (i.e., including foam skin) ranging from about 1.5 to about 5.0 pounds per cubic foot (about 24 to about 80 kg/cu. meter) and preferably ranging from about 2.0 to about 4.0 pounds per cubic foot (about 32 to about 64 kg/cu. meter) and core densities (i.e., without foam skin) ranging from about 1.5 to about 4.5 pounds per cubic foot (about 24 to about 72 kg/cu. meter) and preferably ranging from about 2.0 to about 3.5 pounds per cubic foot (about 32 to about 56 kg/cu. meter). Phenolic foams can be prepared that are substantially closed-cell foams (i.e., substantially free of ruptured cell walls) generally containing at least 90 to 95 percent closed cells and typically greater than 95 percent closed cells as measured, for example, by an air pycnometer according to test ASTM D-2865-70 (1976).

The k factor of a phenolic foam is directly related to the ability of the foamable phenolic resole composition to entrap the blowing agent during the foaming and curing steps and to retain the blowing agent over time. The thermal conductivity of a phenolic foam is directly related to the thermal conductivity of the entrapped gas. A phenolic foam that has only air entrapped would be expected to have a k factor of approximately 0.22. A phenolic foam that has a fluorocarbon entrapped would be expected to have a k factor approaching the thermal conductivity of the entrapped fluorocarbon. Commercial fluorocarbons have k factors around 0.10. Accordingly, an excellent phenolic foam will have a k factor around 0.10 and will retain this k factor over time. Phenolic foams have been prepared from the resoles of this invention that have such a k factor which may be retained over time.

As mentioned herein, it is believed that the generally poor initial k factor of prior art phenolic foam is attributable to two main causes. One cause is the loss of the blowing agent before the cell walls are formed sufficiently strong enough to entrap the blowing agent. The other cause is the rupturing of the cell walls during foaming. Also, as mentioned before, the loss of thermal insulation over time is believed to be caused by the many small perforations found in the cell walls and by the cracking of the thin cell walls by thermal stress.

The main cause of the cell walls rupturing is the pressure exerted by the expanding blowing agent during the formation of the phenolic foam. At the temperatures normally used for commercially preparing phenolic foams (i.e., 125° F.–250° F.), the pressure exerted by the blowing agent during foaming and curing is greater than that which can be withstood by the cell walls, especially during the early part of the foaming and curing. The cell walls of phenolic foams prepared with resoles of the prior art cannot withstand very much pressure until the foaming is complete and substantial curing occurs. Accordingly, the expanding blowing agent ruptures the cells before they are sufficiently cured, resulting in an open-cell foam with unacceptable thermal conductivity characteristics. A method for inhibiting the rupturing of cell walls during foaming and curing is disclosed in a copending application. This method comprises maintaining a pressure against the surfaces of the foamable phenolic resole compositions during foaming and curing.

Another cause of the rupturing of the cell walls is the presence of water in the foamable phenolic resole composition, particularly water present in the catalyst system. The rupturing of cell walls caused by water is not nearly as severe as rupturing caused by not having a restraining force on the foaming composition of at least about the same magnitude as the force generated by the expanding blowing agent or rupturing caused by the use of a phenolic resole that exotherms too fast and too high. A method for inhibiting or preventing the rupturing of cell walls by water is disclosed in a copending application. This method comprises using certain anhydrous aryl sulfonic acids as the foaming and curing catalyst. While these methods help prevent the rupturing of the cell walls, they will not prevent the rupturing of all the cell walls. When the special phenolic resole of the present invention is used, phenolic foam can be prepared that is substantially free of ruptured cell walls.

The loss of blowing agent before the cell walls are formed sufficiently strong to entrap the expanding blowing agent is caused by two interrelated factors. First, the resoles of the prior art are highly reactive. When quantities of the acid curing agent sufficient to foam and cure the resole in acceptable times are added to these resoles, they exotherm very rapidly and reach peak exotherms substantially greater than 200° F. This rapid and high exotherm blows off most of the blowing agent before the cell walls are sufficiently formed to entrap the blowing agent. The result is a phenolic foam with only a small amount of the blowing agent entrapped in the cells. Additionally, a rapid and high exotherm also tends to rupture the cell walls even in the presence of a constraining force. Secondly, the aqueous resoles of the prior art have low viscosity characteristics, especially when formulated into foamable compositions with surfactants, blowing agents and acid catalysts. As the temperature of the foamable composition increases rapidly during the early foaming, the viscosity of the resole is greatly reduced and does not increase until substantial crosslinking of the resole takes place. Cell walls formed from the low viscosity resin are not able to entrap and retain the blowing agent until substantial curing takes place. Accordingly, much of the blowing agent is lost before the cell walls are strong enough, resulting in a phenolic foam with little or no entrapped blowing agent.

The formation of cell walls which are very thin and crack when subject to thermal stress is also caused by resoles having too quick and high of an exotherm and too low of a viscosity. As mentioned above, as the temperature of the foamable composition increases during the early foaming and curing reactions, the viscosity of the phenolic resin decreases or at least does not increase appreciably until substantial crosslinking takes place. During this time, until the viscosity of the phenolic resin appreciably increases, the phenolic resin forming the cell walls has a tendency to drain.

Drainage is accompanied by a progressive thinning of the cell walls and thickening of the struts between the cells. If too much drainage occurs before the resole forming the cell walls is sufficiently crosslinked, the resulting cell walls are very thin. In addition, thin cell walls are easy to rupture and crack very readily when subject to high temperature, drying, or the normal expansion and contraction.

The aqueous phenolic resole of the present invention is an improved resole compared to the prior art phenolic resoles. It is well known in the art to base catalyze the condensation of phenol and formaldehyde in aqueous solutions to produce aqueous condensates commonly called resoles. As discussed herein and as is well known, the aqueous phenolic resoles are readily cured to higher molecular weight, crosslinked thermoset resins. The crosslinking curing reaction is highly exothermic and is greatly accelerated by acidic materials. The resoles of the prior art can be formulated with blowing agents, surfactants, and acid curing agent and optional additives into a foamable composition which can be foamed and cured into phenolic foam. However, the resoles of the prior art generally suffer from two drawbacks; namely, they exotherm too high and too fast and they have too low a viscosity. First, the prior art resoles when used with the quantities of acid catalyst necessary to foam and cure the composition in an acceptable time exotherm too high and too quickly. This causes either the cell walls of the resulting foam to be ruptured by the high pressure exerted or the blowing agent to be blown off before the cell walls are sufficiently strong to entrap the blowing agent. In either case the result is a phenolic foam having an initial poor k factor. Second, the viscosity of the prior art resoles is too low, especially when formulated into foamable compositions. The low viscosity allows the blowing agent to escape before the cell walls are strong enough to entrap the blowing agent and allows the phenolic resole to drain from the cell walls as they are being formed, resulting in very thin cell walls that crack during normal use. This also leads to a phenolic foam with unacceptable thermal insulation properties.

In comparison, the aqueous phenolic resoles of the present invention do not have the drawbacks mentioned above. When formulated into foamable compositions and cured with the quantities of acid necessary to foam and cure the composition in an acceptable commercial time, the resoles do not exotherm too high or too fast. The preferred foamable phenolic resole compositions of the present invention generally reach a maximum pressure in about 2–3 minutes after the acid catalyst is added. During this period the compositions reach a temperature of from about 165°–175° F. The temperature during this period should never exceed 200° F. and preferably never exceed 190° F. The pressures generated using the preferred resoles and foamable resole compositions are usually between 4 and 6 psi above atmospheric pressure. Accordingly, phenolic foams that have entrapped substantially all of the blowing agent and that have cell walls which are not ruptured can be manufactured. Additionally, the viscosity of the foamable resole compositions is high enough to entrap the blowing agent during the early stages and the phenolic resoles do not drain appreciably so that stronger and thicker cell walls are formed.

The improved aqueous phenolic resole of the present invention is essentially a phenol formaldehyde condensation polymer having a molar ratio of formaldehyde to phenol of from about 1.7:1 to about 2.3:1, preferably from about 1.75:1 to about 2.25:1 and most preferably about 2:1. The phenolic resole has a weight average molecular weight of at least about 800 and preferably from about 950 to 1500. The phenolic resole also has a number average molecular weight of at least about 350 and preferably from about 400 to about 600, and a dispersivity greater than 1.7, preferably from about 1.8 to 2.6. The aqueous phenolic resole of the present invention may be a mixture of more than one resole as long as the resulting resole mixture has the required characteristics.

The improved aqueous phenol fonmaldehyde resoles of the present invention are prepared by reacting phenol and formaldehyde in the desired molar ratios in the presence of a basic catalyst until the resulting phenolic resole has the required molecular weight and dispersivity characteristics. The reaction may be accomplished using any of the well known prior art methods. For example, the phenol, formaldehyde and catalyst can be charged to a reactor in the desired molar ratios and reacted until the desired molecular weights are achieved. Alternatively, one or two of the ingredients can be charged to the reactor and the remaining ingredients added to the reaction mixture over time. In the preferred method of preparing the aqueous phenolic resole, the phenol and basic catalyst are added to the reactor and the formaldehyde is metered in serially or continuously during the early part of the condensation reaction. The method for preparing the phenolic resin is not critical so long as the phenol and formaldehyde are condensed in the desired molar ratios and have the required molecular weight and dispersivity characteristics.

As mentioned before, the phenolic resole must have a molar ratio of formaldehyde to phenol of from about 1.7:1 to 2.3:1. If the ratio is higher than 2.3:1, then the resulting phenolic foam may have a residual free formaldehyde content and may create an odor problem. In addition, molar ratios exceeding 2.3:1 yield phenolic resoles that have too slow an exotherm and too high of a processing viscosity. Phenolic foams prepared from resoles having a molar ratio greater than 2.3:1 also tend to be too friable and have poor compressive strength. If the molar ratio is less than 1.7:1, then the resole has too low of a viscosity resulting in thin cell walls. Phenolic resoles having molar ratios less than 1.7:1 also are too highly exothermic, making it difficult to entrap the blowing agent and keep the cell walls from rupturing. Phenolic foams made from these resoles also have too much shrinkage.

The phenolic resole must have a weight average molecular weight greater than about 800, preferably between 950 and 1500. If the weight average molecular weight is less than about 800, the phenolic resin is too reactive and not viscous enough. Phenolic resoles having weight average molecular weights less than about 800 have a peak pressure and temperature exotherm which are too quick and too high. These resoles also reach an exotherm temperature greater than 200° F. during this period. This rapid and high exotherm causes many of the cell walls to be ruptured and the fluorocarbon blowing agent to be lost before the cells are formed. In addition, phenolic resins with weight average molecular weights less than 800 yield foamable phenolic resole compositions that are not viscous enough to form strong, thick cell walls. The phenolic resin tends to drain during foaming and early curing, thus forming cell walls that are thin. The thin cell walls are easily ruptured by the blowing agent and have a tendency to crack upon drying and during use.

The upper limit on the weight average molecular weight is a practical limitation. Resoles having molecular weights in excess of 1500 tend to be very viscous and quite difficult to handle. However, they can be processed into acceptable foams.

The phenolic resoles have a number average molecular weight greater than about 350, preferably, from about 400 to 600 and a dispersivity greater than about 1.7, preferably between 1.8 and 2.6. If the number average molecular weight is below 350 or the dispersivity less than about 1.7, then the phenolic resole has too low of a viscosity. In addition, the phenolic resole is too reactive, i.e., it has too high and too rapid an exotherm. It is difficult to entrap the blowing agent and prevent the rupturing of the cell walls. Phenolic foams made from these resoles also have a shrinkage problem and thin cell walls. If the number average molecular weight is greater than about 600 or the dispersivity greater than 2.6, the resoles tend to be too viscous to handle and react too slowly. These upper values are practical limitations and acceptable foams can be made from resoles having number average molecular weights and dispersivities exceeding these levels.

The phenolic resoles of the present invention may have a free formaldehyde content of up to about 7 weight percent of the resole and a free phenol content of up to about 7 percent by weight. Preferably, the free formaldehyde and phenol are less than about 4 percent by weight. Too much free formaldehyde may cause an odor problem. In addition, the free formaldehyde and phenol affect the reactivity and viscosity of the phenolic resole and foamable composition.

The phenolic resoles of the present invention will generally have a viscosity of from about 1000 centipoises to about 20,000 centipoises at 16 percent water and 25° C. Preferably, the viscosity will be between about 6000 and 10,000 centipoises. The viscosity is not a critical factor so long as the molar ratios, molecular weights, and dispersivity are as set forth herein. It is possible to manufacture phenolic resoles having the above viscosities but not having the required molecular weights and dispersivity. Such resoles are not part of the present invention. Resoles having viscosities within the above range, especially the preferred range, are desirable since they are easily formulated by conventional equipment into uniform foamable phenolic resole compositions.

In addition to phenol itself, other phenolic compounds may be substituted for up to about 10 percent of the phenol. Examples of other suitable phenolic compounds include resorcinol; catechol; ortho, meta and para cresols; xylenols; ethyl phenols; p-tertbutyl phenol and the like. Dinuclear phenolic compounds may also be used. The preferred phenolic resoles will contain primarily phenol itself, with only minor amounts, if any, of other phenolic compounds.

In addition to formaldehyde itself, other aldehydes may be substituted for up to about 10 percent of the formaldehyde. Examples of other suitable aldehydes are glyoxal, acetaldehyde, chloral, furfural and benzaldehyde. The preferred phenolic resoles will contain primarily formaldehyde itself, with only minor amounts, if any, of other aldehydes. The term phenolic resole as used herein is meant to include resoles containing minor amounts of phenolic compounds other than phenol and/or minor amounts of aldehydes other than formaldehyde.

The phenol reactant is added to the reactor usually as an aqueous solution. The concentration of phenol may range from about 50 weight percent to about 95 weight percent. Solutions containing less than 50 weight percent may be used but the resulting reaction mixture is very dilute and consequently increases the reaction time necessary to obtain a resole with the desired molecular weight. It is also possible to use pure phenol; however, no advantage is obtained from using pure phenol when compared to aqueous phenolic solutions of concentrations greater than about 85 percent by weight. In the preferred method concentrated phenolic solutions of 88 weight percent or greater are used.

The formaldehyde reactant is added to the condensation reaction as an ingredient in concentrations from about 30 to about 97 weight percent. Solutions containing less than about 30 weight percent formaldehyde may be used but the resulting reaction mixture is very dilute and consequently increases the reaction time necessary to obtain the desired molecular weight. In the preferred method, concentrated sources of formaldehyde greater than 85 percent by weight are desired. In the preferred method, paraformaldehyde is used as the source of formaldehyde.

The condensation of phenol and formaldehyde is base catalyzed. The basic catalysts generally employed are the alkali and alkaline earth metal hydroxides, carbonates, bicarbonates or oxides; however, other basic compounds may be employed. Examples of useful catalysts are lithium hydroxide, sodium hydroxide, potassium hydroxide, barium hydroxide, calcium oxide, potassium carbonate and the like. The catalysts usually employed are sodium hydroxide, barium hydroxide and potassium hydroxide. The preferred method employs potassium hydroxide.

Although the molar ratios of the phenol and formaldehyde are critical, the other parameters of the condensation reaction such as time, temperature, pressure, catalyst concentrations, reactant concentrations and the like are not critical. These parameters may be adjusted to obtain a phenolic resole having the desired molecular weight and dispersivity. It should be appreciated that in the preferred method the concentrations of the phenol, formaldehyde and catalyst are very important.

The reaction of phenol and formaldehyde is usually effected at temperatures ranging from about 50° C. to 150° C. The preferred reaction temperatures range from about 70° C. to about 95° C. It should be appreciated that the reaction time is dependent on the temperature.

The reaction pressure may vary over a wide range of from atmospheric pressure to about 6 atmospheres of pressure. The reaction may also be run at reduced pressure.

The catalyst concentration may range from about 0.005 to about 0.10 moles of base per mole of phenol.

Preferably, the range is from about 0.005 to about 0.03. In the most preferred method, concentrations of catalyst of from about 0.010 moles to about 0.020 moles of base per mole of phenol are used.

The condensation reaction time will vary depending on the temperature, concentrations of reactants and amount of catalyst employed. Generally the reaction time will be at least 6 hours but no more than 20 hours. As should be appreciated, the reaction wil be run until the phenolic resole has the required molecular weight and dispersivity characteristics.

The time to terminate the reaction can be ascertained by determining the molecular weights and dispersivity as set forth herein; however, this is time consuming and there is a time lag before the results of the determination are completed. In accordance with the invention, it has been found that there is a strong correlation between bubble viscosity and molecular weights and dispersivity for any given set of molar ratios and operating parameters. For example, for the preferred commercial method of making a resole having a molar ratio of 2:1 and using concentrated phenol, concentrated formaldehyde, and high catalyst levels it has been found that a bubble viscosity of 60 seconds will correlate with molecular weights and dispersivities within the preferred ranges. Accordingly, it is possible to use bubble viscosity as an indication of when the desired molecular weights and dispersivity have been obtained; however, the actual molecular weights and dispersivity are still controlling. In addition, if any changes are made in the molar ratios or operating parameters of the process, the bubble viscosity/molecular weights and dispersivity correlation must be determined for those particular conditions.

Since the condensation reaction is catalyzed with a base, the resulting phenolic resole is alkaline. It is desirable to adjust the pH of the phenolic resole to a value of from about 4.5 to 7.0, preferably 5.0 to 6.0, in order to inhibit further condensation reactions from occurring. The pH is adjusted by adding an acid or acid-formi compound. Examples of acids which may be used are hydrochloric acid, sulfuric acid, phosphoric acid, acetic acid, oxalic acid and formic acid. The preferred acid is formic acid.

The phenol formaldehyde resole is obtained as an aqueous solution ranging from about 25 to about 95 weight percent resole. The final concentration will depend on how much water is introduced with the reactants and catalysts which are generally used as aqueous solutions. In addition, water is formed as a by-product of the condensation reaction. In the preferred method the resulting phenolic resole generally has a concentration of about 80 to 90 weight percent resole. Concentration of the phenolic resole to a particular predetermined water content is readily accomplished by conventional stripping at reduced pressures and low temperatures.

In preparing the phenol fomaldehyde resole of the present invention, the phenol and formaldehyde are reacted in the presence of the basic catalyst until the resole has the desired molecular weight and dispersivity characteristics. Thereafter, the pH of the aqueous resole is adjusted and the aqueous resole cooled to about 20° C. It should be appreciated that if the aqueous resole with adjusted pH has a molecular weight that is too low, it may be further bodied until the desired molecular weight is achieved. Bodying of pH adjusted resoles to increase the molecular weight is known in the art. However, since such bodying is slow compared to the base catalyzed reaction, it is desirable to initially react and body the phenol and formaldehyde to the desired molecular weight before adjusting the pH and cooling.

As set forth herein, the aqueous phenol formaldehyde resoles of the present invention are particularly useful in preparing phenolic foam having a low k factor plus other excellent physical characteristics necessary for phenolic foam insulations. The aqueous phenolic resoles of the present invention are also easily processable into phenolic foam. The phenolic resoles can be processed into phenolic foan on a consistent and repeatable basis.

The phenol formaldehyde resoles of the present invention are used for preparing phenolic foam. First, the aqueous phenolic resoles are formulated into a foamable phenolic resole composition. The foamable phenolic resole composition comprises the aqueous phenolic resole of the present invention, a blowing agent particularly a fluorocarbon, a surfactant, an acid catalyst, and optional additives such as plasticizers, formaldehyde scavengers and the like.

The method for preparing the phenolic foam generally comprises introducing into a substantially closed mold the foamable phenolic resole composition and allowing the composition to foam and cure in this mold. The mold is capable of withstanding the pressures generated by the foaming compositions. The amount of pressure will vary depending on such factors as the amount and type of blowing agent, the amount and type of acid catalyst, and the amount and type of resole. Generally, the pressure generated using the resoles of the invention may be from about 3 to 15 psi above atmospheric pressure and the mold should be designed accordingly. The preferred resoles, when formulated into the preferred foamable compositions, will generate about 4–6 psi above atmospheric. The mold should withstand pressures approximately the same as are generated by the foaming composition in order to prevent the cell walls from rupturing. The foamable phenolic resole composition contains the special phenolic resole of this invention. The amount of foamable phenolic resole composition introduced into the mold will vary depending on the density, etc. desired of the phenolic foam. The various components of the foamable phenolic resole composition may be mixed together in any order provided the resulting composition is uniform. It should be noted, however, that the preferred anhydrous aryl sulfonic acid causes the foamable conposition to begin to foam within seconds of being mixed with the phenolic resole and the foaming composition reaches a maximum pressure within minutes. Accordingly, the catalyst should be the last component added to the foamable phenolic resole composition. In the preferred continuous method, some of the components may be premixed before they are metered into the mixing device. However, for the reasons set forth above the catalyst should be the last ingredient entering the mixing device.

Figure 1B:
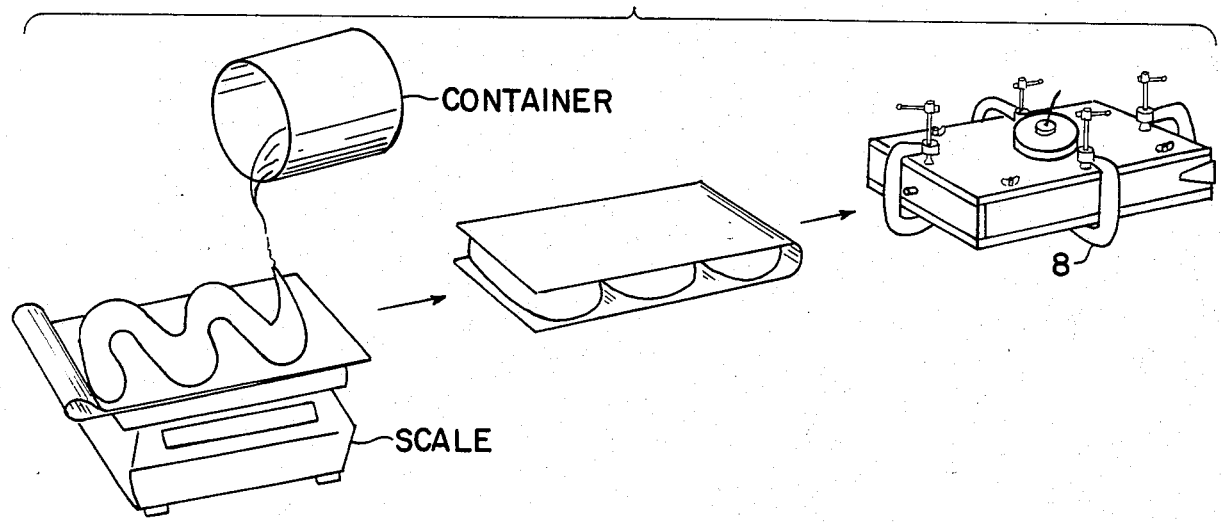

In one embodiment of the invention normally used in the laboratory, the foamable phenolic resole composition is introduced into a rigid, closed mold as illustrated, for example, in FIGS. 1A and 1B. The foamable phenolic resole composition expands initially under essentially atmospheric pressure. As the foamable composition expands to fill the mold, it generates pressure against the walls of the mold. The mold is designed to withstand pressures up to about 15 psi above atmospheric pressure.

With respect to FIGS. 1A and 1B, the mold is comprised of top plate (1), bottom plate (2), side walls (3), and end walls (4). The side walls (3) and one end wall (4) are held together by hinges (5). When in a closed position, the top and bottom plates and the side walls are held in position by bolts (6) and wing nuts (7). In addition, in order to withstand the possible pressures, a series of C-clamps (8) are attached around the perimeter of the mold during the foaming and curing steps. The mold is also provided with a pressure transducer (9) for measuring the pressure in the mold and a thermocouple (10) for measuring the temperature in the mold. The operation of the laboratory mold will be described more fully hereinafter. The size of the mold can be varied by changing the dimensions of the walls and plates.

Figure 2:
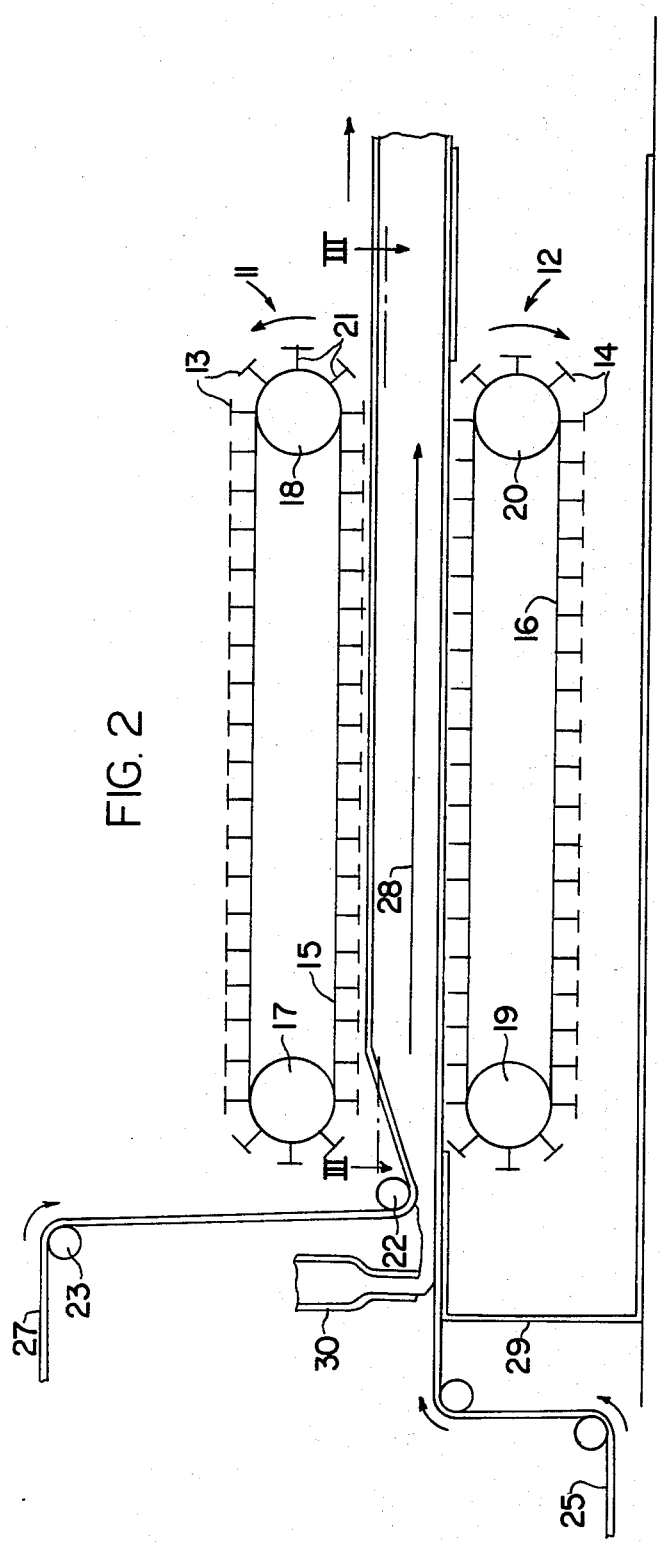
FIG. 2 illustrates diagrammatically a side view of cross section of a double belt type apparatus for continuously making phenolic foam.
Figure 3:
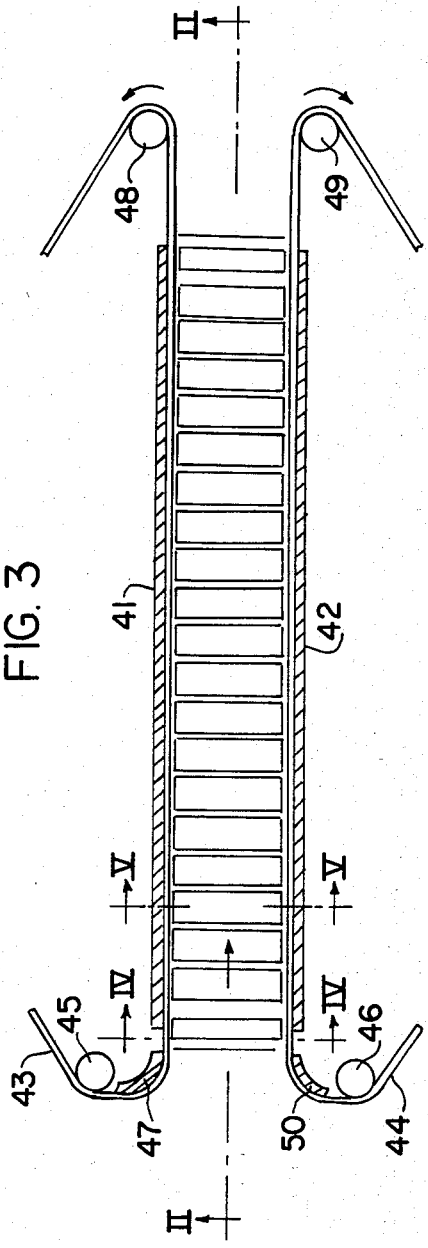
FIG. 3 illustrates diagrammatically a partial sectional view taken along line III—III of FIG. 2.

In another embodiment, a preferred continuous processing technique, the phenolic foam is produced in a double belt press type apparatus illustrated generally in FIGS. 2-5. The ingredients of the foamable phenolic resole composition containing the resole of the present invention are metered in the desired ratios into a suitable mixing device (not shown) and then applied to a lower facing material (25) such as cardboard containing a thin layer of aluminum, a glass mat, a rigid substrate such as hardboard, or a vinyl skin, which material is caused to exit a container (not shown) and move along a table (29) by a lower conveyor (12). The foamable resole composition is applied by means of a suitable distribution device (30) which moves in a back-and-forth motion transversely to the direction of movement of the lower facing material (25), although any suitable means for evenly distributing the composition such as a multiple stream mix head or a series of nozzles may be employed. As the foamable composition is carried downstream, it foams and is contacted by an upper facing material (27) directed by means of rollers (22) and (23) to the region where the foamable composition is in a very early stage of expansion. As the foamable composition expands initially under substantially ambient atmospheric pressure, it is carried into a curing cavity (28) fonmed by the lower portion of an upper conveyor (11), the upper portion of the lower conveyor (12), and two fixed, rigid side walls called side rails not shown in FIG. 2 but illustrated by (41) and (42) in FIG. 3. The thickness of the foam is determined by the distance of the upper conveyor (11) from the lower conveyor (12). The upper conveyor (11) can be moved by any suitable lifting means (not shown) perpendicularly to the lower conveyor (12) which, itself, cannot be raised or lowered. When the upper conveyor (11) is raised or lowered, it moves between the fixed rigid side walls (41 and 42) as illustrated in FIG. 3, which walls are immediately adjacent to the sides of the upper conveyor (11). The surfaces of the conveyor which contact the upper and lower facing materials comprise a plurality of pressure plates (13 and 14) fixed to the conveyor by rigid attaching means (21). The pressure plates may be heated, if necessary, by means of hot air which is introduced into and circulated inside the upper and lower conveyors by means of air ducts not shown in the drawings.

Figure 4:
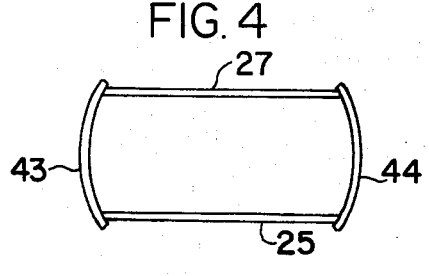
FIG. 4 illustrates diagrammatically a cross-sectional view taken alone IV—IV of FIG. 3.
Figure 5:
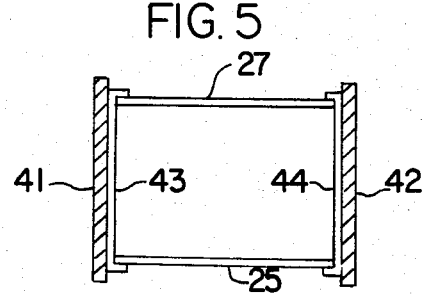
FIG. 5 illustrates diagrammatically a cross-sectional view taken along V—V of FIG. 3.

Simultaneously with the upper and lower facing papers, side papers (43 and 44), as illustrated in FIG. 3, containing a foam-releasing material such as a thin film of polyethylene are guided into the curing cavity by rollers (45 and 46) and means such as guide bars (47 and 50). Each of the guide bars is placed just ahead of the curing cavity (28) such that the side papers (43 and 44), before contacting the side walls (41 and 42), overlap the upper and lower facing materials, for example, as illustrated in FIG. 4. As the side papers (43 and 44) contact the side walls (41 and 42), they flatten as illustrated in FIG. 5.

When the foam has expanded to fill the thickness of the curing cavity, further expansion is constrained by the pressure plates (13 and 14) as illustrated in FIG. 2, and the side walls (41 and 42) as illustrated in FIG. 3. The pressure exerted by the foam on the pressure plates and side walls will vary as described above but typically will be in the range of about 3 pounds per square inch to about 15 pounds per square inch above atmospheric pressure. The pressure plates (13 and 14) and side walls (41 and 42) are designed to withstand these pressures.

Processing paraneters such as the amounts of the components of the foamable phenolic resole composition, the flow rate of the composition from the distribution device, and the conveyor speed may be varied widely in the practice of the invention to provide phenolic foam having the desired thickness, density, etc. Sufficient foamable composition should be used to ensure that foam fills the curing cavity and exerts a pressure against the cavity walls.

After the phenolic foam leaves the curing cavity, the side papers (43 and 44) are removed, for example, by means of rollers (48 and 49), as illustrated in FIG. 3. The foam may be cut to desired lengths depending on the intended use.

The amount of the aqueous phenolic resole present in the foamable phenolic resole compositions used to produce substantially closed-cell phenolic foams may vary within wide limits provided it is in an amount sufficient to produce such foam having the desired density and compressive strength. Generally, the amount of phenolic resole present in the foamable composition ranges from about 40 percent to about 70 percent by weight of the composition. An amount in the range of from about 45 percent to about 55 percent by weight of the foamable composition is preferred. The above weight percent of phenolic resole in the foamable composition is based on 100 percent active phenolic resole. Since the resole is an aqueous solution, the actual concentration of the resole must be accounted for in calculating how much of the aqueous resole solution goes into the foamable phenolic resole composition.

Any suitable blowing agent may be used. In choosing the blowing agent, it must be remembered that the k factor of the phenolic foam is directly related to the k factor of the blowing agent entrapped in the phenolic foam. Although blowing agents such as n-pentane, methylene chloride, chloroform and carbon tetrachloride may be used, they are not preferred since they do not have the excellent thermal insulation properties of fluorocarbon blowing agents. In addition, fluorocarbon blowing agents are not soluble in the phenolic foam and hence will not diffuse out over time while some of the above mentioned blowing agents have a certain compatibility with the phenolic foam and hence may diffuse out over time. They may be used, however, in combination with the preferred fluorocarbon blowing agents. It is preferred that the blowing agent comprise a chlorofluorocarbon blowing agent. Examples of suitable fluorocarbon blowing agents include: dichlorodifluoromethane; 1,2-dichloro-1,1,2,2-tetrafluoroethane; 1,1,1-trichloro-2,2,2-trifluoroethane; trichloromonofluoromethane; and 1,1,2-trichloro-1,2,2-trifluoroethane. The blowing agent may be a single blowing agent compound or it may be a mixture of such compounds. Ordinarily the fluorocarbon blowing agents employed have boiling points at atmospheric pressure, viz., an absolute pressure of 760 millimeters of mercury, in the range of from about −5° C. to about 55° C. An atmospheric boiling point in the range of from about 20° C. to about 50° C. is typical. The preferred blowing agent is a mixture of trichloromonofluoromethane and 1,1,2-trichloro-1,2,2-trifluoroethane. It is especially preferred that the weight ratio of the trichloromonofluoromethane to the 1,1,2-trichloro-1,2,2-trifluoroethane in the mixture be from about 1:1 to 1:3.

The blowing agent generally is present in the foamable composition in an amount which will produce substantially closed-cell phenolic foam having an initial low k factor. The amount of blowing agent may vary widely but it generally ranges from about 5 percent to about 20 percent by weight of the foamable composition. An amount of blowing agent in the range of from about 5 percent to about 15 percent by weight of the foamable composition is typical. An amount in the range of from about 8 percent to about 12 percent by weight is preferred.

The foamable phenolic resole conposition also contains a surfactant. The surfactant should exhibit properties which enable it to effectively emulsify the aqueous phenolic resole, blowing agent, catalyst and optional additives of the foamable composition. To prepare a good foam, the surfactant should lower the surface tension and stabilize the foam cells during foaming and curing. It has been found that non ionic, non hydrolyzable silicone-glycol surfactants are most useful, although any surfactant having the requisite properties described above may be employed. Specific examples of suitable silicone surfactants include L-7003 silicone surfactant, L-5350 silicone surfactant, L-5420 silicone surfactant, and L-5340 silicone surfactant (which is preferred), all from Union Carbide Corporation, and SF-1188 silicone surfactant from General Electric Company. Another class of surfactants which may be used are the non-ionic organic surfactants such as the condensation products of alkylene oxides such as ethylene oxide, propylene oxide or mixtures thereof, and alkylphenols such as nonylphenol, dodecylphenol and the like. Other suitable organic surfactants are known and include, for example, those disclosed in U.S. Pat. No. 3,389,094, so much of which as regards organic surfactants is hereby incorporated by reference.

Another class of suitable surfactants which may find application in the present invention include siloxane-oxyalkylene copolymers such as those containing Si-O-C as well as Si-C linkages. Typical siloxane-oxyalkylene copolymers contain a siloxane moiety composed of recurring dimethylsiloxy units endblocked with mononethylsiloxy and/or trimethylsiloxy units and at least one polyoxyalkylene chain composed of oxyethylene and/or oxypropylene units capped with an organic group such as an ethyl group. Specific examples of suitable siloxane-oxyalkylene polymers may be found in U.S. Pat. No. 3,271,331, so much of which as regards siloxane-oxyalkylene surfactants is hereby incorporated by reference. Care must be taken in selecting the surfactant since some surfactants will adversely affect the viscosity of the foamable phenolic resole composition or cause the collapse of the foam before it is set.

The surfactant used in the foamable composition may be a single surfactant or a mixture of surfactants. The surfactant is used in the present invention in an amount sufficient to produce a good emulsion. Generally the amount of surfactant ranges from about 0.1 percent to about 10 percent by weight of the foamable phenolic resole composition. Typically, the amount of surfactant ranges from about 1 percent to about 6 percent by weight of the composition. An amount of surfactant in an amount of from about 2 percent to about 4 percent by weight of the composition is preferred.

The surfactant may be separately mixed with the phenolic resole, blowing agent and catalyst to form the foamable phenolic resole composition or it may be admixed with the phenolic resole or blowing agent before blending with the other components. Alternatively, part of the surfactant may be premixed with the phenolic resole and part may be premixed with the blowing agent. It is preferred that about ⅓ of the surfactant be premixed with the fluorocarbon blowing agent and ⅔ be premixed with the phenolic resole.

Although water is believed to be the main cause of perforations in the cell walls and to contribute to the rupturing of cell walls, the presence of water in the resole is necessary. First of all, it is very difficult and expensive to produce a phenolic resole that has very little or no water. Moreover, phenolic resoles having characteristics of present resoles without water are extremely difficult to handle. They are very viscous and difficult to formulate into foamable compositions. In addition, it is difficult to control the exotherm of the reaction without water. Accordingly, water is necessary in the foamable phenolic resole composition to adjust the viscosity of the phenolic resole and the resulting foamable phenolic resole composition to that which is favorable for producing phenolic foams. In addition, water is desirable to act as a heat sink and to help control the exothermic foaming and curing reaction. Most of the water is present in the aqueous phenolic resole although limited amounts may be tolerated in the fluorocarbon blowing agent or surfactant. The amount of water present in the phenolic resole foamable composition will generally be in the amount of from 5 percent to about 20 percent by weight of the foamable composition. An amount ranging from about 7 percent to about 16 percent by weight is preferred. In addition, it is important that the water in the aqueous resole is uniformly mixed with the resole. If the aqueous resole contains water that is not uniformly mixed with the resole the result may be ruptured cell walls.

The acid catalyst component of the foamable phenolic resole composition may be any strong organic or inorganic acid, i.e., a pKa of less than about 2.0. Examples of strong inorganic acids are hydrochloric, sulfuric, phosphoric, and nitric. Examples of strong organic acids are trichloroacetic, picric, benzene sulfonic, toluene sulfonic, xylene sulfonic, phenol sulfonic, methane sulfonic, ethane sulfonic, butane sulfonic and the like. Mixtures of one or more of the above acids is also possible.

As mentioned herein, one of the drawbacks of prior art phenolic foam is the presence of small perforations in the cell walls. It is believed that water, particularly water present in the catalyst, is the main cause of the perforations in the cell walls and also adds to the rupturing of the cell walls. Accordingly, the acids used should contain the least amount of water that is possible. The preferred catalysts are certain anhydrous aryl sulfonic acids which are the subject matter of a copending application. Among the anhydrous aryl sulfonic acids toluene sulfonic and xylene sulfonic are preferred, with a mixture of these two being most preferred.

The amount of acid curing catalyst in the foamable phenolic resole composition may vary over a relatively wide range. As a practical limitation, the amount of catalyst used is that amount which will provide a rise time of about 10 seconds to 1 minute and a set time of 0.5 to 5 minutes. In general, the amount of catalyst on an anhydrous basis will be from about 6 percent by weight to about 20 percent by weight of the foamable composition, preferably from about 12 to 16 weight percent.

In addition to the aqueous phenolic resole, fluorocarbon blowing agent, acid catalyst, and surfactant, the foamable phenolic resole compositions may contain other materials known in the art in their customary amounts for their customary purposes. Examples of such optional ingredients are as follows. Resorcinol or urea may be added to scavenge free formaldehyde, generally in the range of from 0.5 to 5 percent by weight. Plasticizers such as triphenyl phosphate, dimethyl terephthalate or dimethyl isophthalate may also be added in amounts essentially from about 0.5 to 5 percent by weight. Anti-glow, anti-spalling and anti-punking agents may also be added in amounts usually ranging from about 0.5 to 5 percent by weight. The preferred foamable phenolic resole compositions will contain about 3 percent by weight urea and about 3 percent by weight plasticizer. The urea and plasticizer are preferably premixed with the phenolic resole before it is mixed with the other ingredients of the foamable phenolic resole composition.

The aqueous phenolic resoles are useful as foundry binders, wood adhesives, bindes for plywood and particle board and low shrink molding compounds; however, the aqueous phenolic resoles are most useful in the production of phenolic foam thermal insulation for widely varying domestic and industrial uses. The invention is particularly advantageous as a method of producing phenolic foams having excellent insulation properties from foamable compositions based on phenolic resoles produced from relatively low cost phenol and formaldehyde preferably as paraformaldehyde. Phenolic foam produced with the resoles of the invention exhibits not only a good initial k factor but also good k factor retention unlike phenolic foams generally known in the art. Thus, the resoles of the invention meet a long sought-after but heretofore unrealized goal of producing a phenolic foam having both good initial k factor and good k factor retention from phenolic resoles such as simple phenol formaldehyde resoles and thereby represents an important advancement in the phenolic foam art.

The values of the various properties of the phenol formaldehyde resoles and the phenolic foams produced therefrom were, unless otherwise set forth, determined in accordance with the following methods.

Viscosity reported herein as bubble viscosity was determined at 25° C. in a Gardner-Holdt bubble viscosity tube in accordance with ASTM D-1545-76 and is reported herein as seconds, bubble seconds or bubble viscosity.

Viscosity reported in centipoise (cps.) was determined by use of a Brookfield Viscoaeter Model RVF. Measurements were made when the resole was 25° C. and the spindle was chosen to give a near mid range reading at 20 rpm. Spindle number 5 was employed for most readings. (ASTM D-2196)

The pH of the resole was measured using the Fisher Accumet pH Meter Model 610 A. The pH probe was standardized with pH standards at 4.0, 7.0, and 10.0 before each use. (ASTM E-70)

The content of phenol in the resole was measured using an infrared spectrophotometric determination. The infrared determination was carried out using a recording infrared spectrophotometer with sodium chloride optics (Perkin Elmer Model No. 21), sealed liquid absorption cells and sodium chloride windows of 0.1 mm. The method consisted of measuring the infrared absorbance of an acetone solution of the phenolic resole at 14.40 microns. The phenol content of the resole sample was then determined by comparing the absorbance of the sample with the absorbance of standard solutions of known phenol content measured under identical conditions. This method has been found to be reproducible to ±0.14 percent phenol.

The free formaldehyde content in the phenolic resole was determined by the hydroxylamine hydrochloride method. The general method comprises dissolving the resole sample in methanol, adjusting the pH to bromophenol blue endpoint and adding an excess of hydroxylamine hydrochloride. The reaction liberates hydrochloric acid which is titrated with standard sodium hydroxide to the same bromophenol blue endpoint.

First, a sample of the resole is weighed to the nearest 0.1 milligram (usually 1–3 gram sample) in a 150 cc beaker containing 10 cc of methanol. The mixture is stirred until the resole is completely dissolved. The weight of resole sample used should be such that more than ½ of the hydroxylamine hydrochloride remains after the reaction is complete. After the resole is dissolved in the methanol, 10 cc of distilled water and 10 drops of bromophenol blue indicator are added. The pH of the sample solution is adjusted by adding 0.5N sodium hydroxide or 0.5N sulfuric acid dropwise until the indicator just turns blue. Then 25 cc of hydroxylamine hydrochloride solution (ACS grade) is pipetted into the beaker and the reaction allowed to proceed at room temperature for 15 minutes. Then the solution is titrated rapidly with 0.5N sodium hydroxide solution to the blue color to which the sample solution had been previously adjusted. The sample solution is magnetically stirred during the titration and the stirring intensity is very vigorous as the endpoint is approached. Simultaneously with the above, the same procedure is followed for a blank using all ingredients except the sample resole. The free formaldehyde content of the sample is then calculated as follows:

$$\% \text{ Free Formaldehyde} = \frac{(V_1 - V_2) \times N \times 3.001}{W}$$

where
$V_1$ = volume of 0.5N sodium hydroxide solution used for sample titration expressed in cc.
$V_2$ = volume of 0.5N sodium hydroxide solution used for blank titration, expressed in cc.
$N$ = normality of sodium hydroxide solution.
$W$ = weight of sample of resole expressed in grams.
3.001 = constant factor to convert the gran equivalent weight of formaldehyde to percent.
For additional information on this procedure see Kline, G. M., "Analytical Chemistry of Polymers", High Polymers, Vol. II Part 1, Interscience Publishers, Inc. (1959).

Water content of the resoles was measured in accordance with the method of Karl Fischer, modified to determine the endpoint of the titration electrometrically. The instrument used was an Automatic Karl Fischer Titrator, Aquatest II from Photovolt Corp. and the apparatus was assembled, filled and electrically connected in accordance with the manufacturer's instructions. An appropriate sample of the resole as suggested in the following table is weighed into a clean, dry volumetric flask. From 20–50 cc of dry pyridine or methanol is added to the flask, the flask capped and the solution stirred thoroughly until the resole sample is completely dissolved. The solution is diluted to volume with dry pyridine or methanol, the flask capped with a sleeve-type rubber stopper, and the flask shaken to mix the solution.

| Table of Estimated Sample Size | | |
|---|---|---|
| Resole Weight (grams) | Final Sample Solution (cc) | Anticipated Water (Wt %) |
| 3–4 | 50 | 0.3–5 |
| 2–3 | 100 | 5–15 |
| 1–2 | 100 | 15–25 |
| 1 | 100 | >25 |

Using an appropriate dry syringe and needle, 1 or 2 cc of the sample to be tested is drawn into the syringe and discharged into a waste container. This rinsing is repeated several times. Then the sample is drawn into the syringe until the volume is slightly beyond the desired calibration mark and then adjusted to the desired mark. The needle of the syringe is wiped clean with a tissue and the needle inserted through the sample port septum until it is under the surface of the titrating solution. The sample is then injected into the titration solution and the syringe quickly withdrawn. The automatic titration is activated and the results recorded when the titration is completed. In the same manner as described above, the water content of a blank is determined. The weight percent of water is calculated as follows:

$$\text{Water Content (wt. \%)} = \frac{(C_1 - C_2)\left(\frac{V_2}{V_1}\right)}{W \times 10,000}$$

where $C_1$ = readout number indicating total $\mu$g of water in sample analyzed.

$C_2$ = readout number indicating totaling of water in blank.

$V_2$ = volume to which dissolved sample was diluted in cc.

$V_1$ = volume of sample titrated in cc.

$W$ = weight of resole sample.

For additional information on this procedure see Mitchell, J. Sr., and Smith, D. M., "Aquametry", Chemical Analysis Series, Vol. 5, Interscience Publishers Inc. (1948).

The weight average molecular weight, number average molecular weight and dispersivity of the resoles were determined by Gel Permeation Chromatography. The instrument used was the Gel Permeation Chromatograph of Waters Associates, Inc., having five columns arranged in series (each column 1 foot in length) packed with Styragel. The pore sizes of the Styragel were as follows and in the following order: 1 column of 1000 Å, 2 columns of 500 Å, 2 columns of 1100 Å. Detection was by differential refractive index (Waters Differential Refractometer R401). The system was operated with tetrahydrofuran (THF) as the solvent and at a flow rate of 2 mls/minute. The sample of resole weighing about 220–250 mgs was dissolved in 25 ml of THF. To avoid variations due to solvent evaporation, the solutions were transferred with minimal exposure to air and were weighed in stoppered flasks. The GPC was calibrated using monodispersed polystyrene as the standard polymer against which the resole was measured. The calibration was conducted at room temperature using THF as the solvent for the polystyrene. The results of the GPC were recorded and reduced on a recorder data processor from Waters Associates (730 Data Module) which performed all calculations and printed the final results of the analysis. For detailed information on the operation see Waters literature. See, also, Waters publication No. 82475 entitled, "GPC, Data Reduction & the 730-150 C Combination" and Waters Technical Brief No. 102, "HPLC Column Performance Rating". Unfaced core samples were used to measure k factors by ASTM C-518 Revised.

The following examples illustrate the invention. Parts and percentages are by weight unless specified otherwise.

EXAMPLE 1

A phenol formaldehyde resole of the present invention having a molar ratio of formaldehyde to phenol of 2:1 was prepared in the laboratory in a 4-liter reactor equipped with a reflux condenser, a thermocouple for reading temperatures in °C., an addition funnel, an air stirrer with double blade impeller, and means for heating (mantle) and cooling (ice bath) the reactor. First, 1434 grams of 90 percent phenol (13.73 moles) was weighed out and added to the reacto. Then 1207 grams of flake 91 percent paraformaldehyde (36.61 moles) was weighed out and added to the reactor. This phenol-formaldehyde mixture was stirred while being heated to 78° C. In the meantime, a solution of aqueous 45 percent KOH was prepared. Then 35.53 grams of the 45 percent KOH solution (0.285 moles) was added to 478.4 grams of 90 percent phenol (4.58 moles) and thoroughly mixed. This KOH-phenol mixture was then charged to the addition funnel. When the reactor temperature reached 78° C., the KOH-phenol solution was added by dropwise addition over a 150-minute period. During the addition period, the temperature in the reactor was maintained in the range of 78° C. to 80° C. by heating and/or cooling the reactor. In the early stages of addition, it was necessary to occasionally cool the reactor to control the exothermic reaction. Also during the early stages, a slight gel developed which disappeared during the addition period. Close attention to the temperature was observed when the gel was present since the heat transfer through a gel is somewhat slow.

After all of the phenol-KOH mixture was added, the reaction mixture was heated to 85° C.–88° C. and maintained at this temperature. Bubble viscosities were run at a temperature of 25° C. in a Gardner-Holdt bubble viscosity tube (ASTM D-1545-76) on samples of the reaction mixture taken every 30 minutes after the temperature reached 85° C.–88° C. When a bubble viscosity of about 15 sec. was obtained, the reaction mixture was cooled gradually ($\approx$15 min.) to a temperature of about 68° C.–79° C. When this temperature was reached and maintained, bubble viscosities were again run every 30 minutes until a bubble of about 30 sec. was obtained. The bubble viscosities were then determined every 15 minutes until a bubble of about 60 sec. was obtained. At a 60 sec. bubble viscosity 14.57 grams of a 90 percent formic acid solution (0.285 mole) was added to the reactor and the reaction mixture cooled to 55° C. When the reaction temperature reached 55° C., 190 grams Morflex 1129 (dimethyl isophthalate) were added and allowed to dissolve. The reaction mixture was then transferred to a storage container and was stored in a refrigerator until used. The resulting resole had a Brookfield viscosity of 6,600 centipoise at 25° C. The resole contained 1.9 percent free phenol, 3.6 percent free formaldehyde, and 17.3 percent water. The weight average molecular weight was 981, the number average molecular weight was 507, and the dispersivity was 1.93.

EXAMPLE 2

A phenol formaldehyde resole of the present invention having a molar ratio of formaldehyde to phenol of 2:1 was prepared on a commercial scale in a 1,000-gallon reactor equipped with a reflux condenser, a thermocouple for reading temperatures in °C., means for accurately adding chemicals, means for agitating the mixture, and means for heating and cooling the reaction mixture.

First, 3,805.63 pounds of 90 percent phenol (16,542.3 gram moles) was charged to the reactor. Then 3,203.16 pounds of flake 91 percent paraformaldehyde (44,111.78 gram moles) was charged to the reactor with agitation. This phenol-formaldehyde mixture was stirred while being heated to 78° C. and held at this temperature for about two hours.

In the meantime, in a blend tank a solution of KOH and phenol was prepared by thoroughly mixing 1,268.55 pounds of 90 percent phenol (5,514.14 gram moles) and 94.44 pounds of 45 percent KOH solution (343.92 gram moles).

After two hours and with the reactor temperature initially at 78° C., the KOH-phenol solution was added to the reactor at a rate of 0.90–1.35 gallons per minute over a 2-½ hour period. During the addition period, the temperature in the reactor was maintained in the range of 78° C.–82° C. by heating and/or cooling the reactor or temporarily stopping the addition of the phenol-KOH.

After all of the phenol-KOH mixture was added, the reaction mixture was heated to 85° C.–88° C. and maintained at this temperature. Bubble viscosities were run at a temperature of 25° C. in a Gardner-Holdt bubble viscosity tube (ASTM D-1546-76) on samples of the reaction mixture taken every 30 minutes after the tenperature reached 85° C.–88° C. When a bubble viscosity of about 15 sec. was obtained, the reaction mixture was cooled gradually to a temperature of about 68° C.–79° C. When this temperature was reached, bubble viscosities were again run every 15 minutes until a bubble of about 30 sec. was obtained. The bubble viscosities were then determined every 15 minutes until a bubble of about 60 sec. was obtained. At a 60 sec. bubble viscosity, 38.72 pounds of a 90 percent formic acid solution (343.90 gram moles) was added to the reactor and the reaction mixture cooled to 55° C. When the reaction mixture reached 55° C., 235 pounds Morflex 1129 was added and allowed to dissolve. The reaction mixture was then transferred to a storage tank and kept cool until used. The resulting resole had a Brookfield viscosity of 7,400 at 25° C. The resole contained 3.2 percent free phenol, 3.5 percent free formaldehyde, and 14.6 percent water. The resole had a weight average molecular weight of 1222, a number average molecular weight of 550, and a dispersivity of 2.22.

EXAMPLE 3

A phenol formaldehyde resole having a molar ratio of formaldehyde to phenol of 2:1 was prepared in the laboratory using the preferred process in a 4-liter reactor equipped with a reflux condenser, a thermocouple for reading temperatures in °C., an addition funnel, an air stirrer with double blade impeller, and means for heating (mantle) and cooling (ice bath) the reactor. First, 2550 grams of 90 percent phenol (24.4 moles) was weighed out and added to the reactor. Then 45.6 grams of 45 percent KOH solution (0.366 moles) was weighed out and added to the reactor. This phenol-catalyst mixture was agitated while being heated to 78° C. In the meantime, 1610 grams of 91 percent paraformaldehyde flake (48.8 moles) was weighed out. When the reactor temperature reached 78° C., one-tenth of the paraformaldehyde flake (161.0 grams) was added to the reactor. This incremental addition of paraformaldehyde was performed in a total of 10 substantially equal additions staggered at 10 minute intervals. During the addition period, the temperature was maintained between about 78°–82° C.

After all of the paraformaldehyde was added, the reaction mixture was heated to 85° C.–88° C. and maintained at this temperature. Bubble viscosities were run at a temperature of 25° C. in a Gardner-Holdt bubble viscosity tube (ASTM D-1545-76) on samples of the reaction mixture taken every 30 minutes after the temperature reached 85°–88° C. When a bubble viscosity of about 15 sec. was obtained, the reaction mixture was cooled gradually ($\approx$15 min.) to a temperature of about 78° C. When this temperature was reached, bubble viscosities were again run every 15 minutes until a bubble of about 60 sec. was obtained. At a 60 sec. bubble viscosity, 18.7 grams of a 90 percent formic acid solution (0.366 mole) was added to the reactor and the reaction mixture cooled to 65° C. When the reaction mixture reached 65° C., 190 grams Morflex 1129 (dimethyl isophthalate) was added and allowed to dissolve. The reaction mixture was then transferred to a storage container and was stored in a refrigerator until used. The resulting resole had a Brookfield viscosity of 6,000 centipoise at 25° C. The resole contained 2.3 percent free phenol, 3.4 percent free formaldehyde, and 17.5 percent water. The resole had a weight average molecular weight of 902, a number average molecular weight of 448, and a dispersivity of 2.01.

EXAMPLE 4

A phenol fonmaldehyde resole having a molar ratio of formaldehyde to phenol of 2:1 was prepared on a commercial scale using the preferred process in a 6000-gallon reactor equipped with a reflux condenser, a thermocouple for reading temperatures in °C., means for accurately adding chemicals, means for agitating the mixture, and means for heating and cooling the reaction mixture.

First, 30,325 pounds of 90 percent phenol (131,700.8 gram moles) was charged to the reactor. Then 565 pounds of 45 percent KOH solution (2055.8 gram moles) was charged to the reactor with agitation. This mixture was stirred while being heated to 78° C.

In the meantime, 19,183 pounds of 91 percent paraformaldehyde flake (263,942.7 gram moles) was weighed out.

When the reactor temperature reached 78° C., the paraformaldehyde flake was metered into the reactor at a substantially even rate over a period of three hours. During the addition period, the temperature in the reactor was maintained in the range of 78°–82° C.

After all of the paraformaldehyde was added, the reaction mixture was heated to 85°–88° C. and maintained at this temperature. Bubble viscosities were run at a temperature of 25° C. in a Gardner-Holdt bubble viscosity tube (ASTM D-1546-76) on samples of the reaction mixture taken every 30 minutes after the temperature reached 85°–88° C. When a bubble viscosity of about 15 sec. was obtained, the reaction mixture was cooled to a temperature of about 78° C. When this temperature was reached, bubble viscosities were again run every 15 minutes until a bubble of about 45 sec. was obtained. Then the temperature was cooled to 68°–70° C. and bubble viscosities were then determined every 15 minutes until a bubble of about 60 sec. was obtained. At a 60 sec. bubble viscosity, 209 pounds of a 90 percent formic acid solution (1854.8 gram moles) was added to the reactor and the reaction mixture cooled to 55° C. While cooling the reaction mixture to 55° C., 2114 pounds Morflex 1129 was added and allowed to dissolve. The reaction mixture was then transferred to a storage tank and kept cool until used. The resulting resole had a Brookfield viscosity of 8,700 at 25° C. The resole contained 3.7 percent free phenol, 2.92 percent free formaldehyde, and 15.6 percent water. The resole had a weight average molecular weight of 1480, a number average molecular weight of 582, and a dispersivity of 2.55.

EXAMPLE 5

A phenolic resole having a molar ratio of formaldehyde to phenol of 2:1 was prepared in the laboratory in accordance with the procedure set forth in Example 3 except the reaction was terminated, the pH adjusted, Morflex 1129 added and the resole solution cooled when a bubble viscosity of 10 seconds was obtained.

The resulting resole had a Brookfield viscosity of 850 cps. at 25° C. The resole contained 4.1 percent free phenol, 4.9 percent free formaldehyde and 14.0 percent water. The resole had a weight average molecular weight of 519, a number average molecular weight of 400, and a dispersivity of 1.26.

EXAMPLE 6

A phenol formaldehyde resole having a molar ratio of formaldehyde to phenol of 2:1 was prepared in the laboratory in a 4-liter reactor equipped as set forth in Examples 1 and 3. First, 2550 grams of 90 percent phenol (24.4 moles) was weighed out and added to the reactor. Then 1610 grams of 91 percent paraformaldehyde was weighed out and added to the reactor. This phenol-formaldehyde mixture was stirred and heated to 70° C. In the meantime, while heating the phenol-formaldehyde mixture, a 45 percent KOH solution was prepared. When the temperature reached 70° C., 1/6 of the KOH solution was added (7.6 grams, 0.061 mole). After 10 minutes, another 1/6 of the KOH solution was added. The remainder of the KOH was added in the same manner and the reaction mixture allowed to exotherm to reflux conditions and maintained at reflux for 30 minutes. The reaction mixture was then cooled to 78° C. and reacted at this temperature until a bubble viscosity of 80 seconds was achieved. The pH was then adjusted by the addition of 18.7 grams (0.366 mole) of 90° formic acid. The phenolic resole solution was then cooled to 65° C. and 190 grams of Morflex added and the solution further cooled to 55° C. The resole solution was then transferred to a storage container and kept refrigerated until used.

The resulting resole had a Brookfield viscosity at 25° C. of 7,500 cps. The resole contained 2.4 percent phenol, 3.2 percent formaldehyde, and 15.8 percent water. The resole had a weight average molecular weight of 1055, a number average molecular weight of 534, and a dispersivity of 1.98.

EXAMPLE 7

A phenol formaldehyde resole having a molar ratio of formaldehyde to phenol of 2:1 was prepared in the laboratory using the equipment and general procedure set forth in Examples 1 and 3 with the following changes.

First, 1434 grams of 90 percent phenol (13.73 moles) was charged to the 4-liter reactor. Then 1207 grams of 91 percent paraformaldehyde flake (36.61 moles) was charged to the reactor. This phenol-formaldehyde mixture was stirred and heated to 78° C. In the meantime, a 45 percent KOH solution was prepared and 35.53 grams of this 45 percent KOH solution (0.285 mole) was added to 478 grams of 90 percent phenol (4.58 moles) and this KOH-phenol mixture was mixed. The KOH-phenol mixture was then charged to the addition funnel. When the phenol-formaldehyde mixture reached a temperature of 78° C., the KOH-phenol mixture was added dropwise over a 150 minute addition period. The remainder of the reaction was performed in accordance with Example 3.

The phenolic resole had a Brookfield viscosity of 6000 centipoise at 25° C. The resole had 3.2 percent phenol, 3.2 percent formaldehyde, and 15.1 percent water. The resole had a weight average molecular weight of 1156, a number average molecular weight of 543, and a dispersivity of 2.13.

EXAMPLE 8

A phenol formaldehyde resole was prepared in the laboratory in accordance with the procedure set forth in Example 3 except the molar ratio of formaldehyde to phenol was 1.6:1.

The resulting phenolic resole had a Brookfield viscosity of 6,200 at 25° C. The resole had 1.5 percent formaldehyde, 3.7 percent phenol, and 16 percent water. The resole had a weight average molecular weight of 1248, a number average molecular weight of 532.6, and a dispersivity of 2.36.

EXAMPLE 9

A phenol formaldehyde resole was prepared in the laboratory in accordance with the procedure set forth in Example 3 except the molar ratio of formaldehyde to phenol was 2.4:1.

The resulting phenolic resole had a Brookfield viscosity of 6,400 at 25° C. The resole had 6.7 percent formaldehyde, 1.5 percent phenol, and 18 percent water. The resole had a weight average molecular weight of 1030, a number average molecular weight of 561, and a dispersivity of 1.85.

EXAMPLE 10

A phenol formaldehyde resole was prepared in the laboratory following the procedure set forth starting at column 29, line 15 for Resole No. III of U.S. Pat. Nos. 4,176,106 and 4,176,216.

The resulting phenolic resole had 7.3 percent formaldehyde, 5.6 percent phenol, and 7.9 percent water. The resole had a weight average molecular weight of 688, a number average molecular weight of 440, and a dispersivity of 1.56.

EXAMPLE 11

A phenol formaldehyde resole was prepared in accordance with Example 10. After the resole was prepared, the water content was adjusted to 16 percent. Then the resole was heated to 68°-70° C. and maintained at this temperature until a bubble viscosity of 80 seconds was obtained.

The resulting resole had 5.4 percent formaldehyde, 2.3 percent phenol and 14.8 percent water. The resole had a weight average molecular weight of 882, a number average molecular weight of 515.8, and a dispersivity of 1.71.

EXAMPLE 12

A phenolic resole was prepared in accordance with Example 17 of U.S. Pat. No. 3,953,645.

The resulting resole had 1.9 percent formaldehyde, 8.8 percent phenol and 10.8 percent water. The phenolic resole had a weight average molecular weight of 2295, a number average molecular weight of 590, and a dispersivity of 3.89.

EXAMPLE 13

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9 ⅜"×13"×2". The dimensions of the mold may be modified, for example, by substituting 1.5" or 3" wide bars for the 2" sides.

The mold was coated with a mold release agent and preheated in a 150° F. oven. A piece of dry corrugated cardboard of about 9⅜" by 28" was dried in a 150° oven for about 10–15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-7003). This fluorocarbon blowing agent mixture was put in an ice bath and cooled to 50°–66° F. Then 76.6 parts (254.3 grams) of a phenolic resole prepared as in Example 1 was mixed with the high speed air mixer with 2.4 parts (8.0 grams) of silicone surfactant L7003. The fluorocarbon blowing agent/surfactant premix was then mixed with the phenolic resole/surfactant premix. This mixture of phenolic resole, blowing agent and surfactant was cooled in the ice bath to 50°–55° F. Then 10 parts (33.2 grams) of an anhydrous toluene sulfonic/xylene sulfonic acid mixture (ULTRA-TX acid from WITCO Chemical) was weighed into a syringe and cooled to 40°–45° F. The cardboard and mold were removed from the oven. The anhydrous aryl sulfonic acid catalyst was then mixed with the phenolic resole, blowing agent and surfactant mixture at high rpm for 10–15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties.

Figure 6:
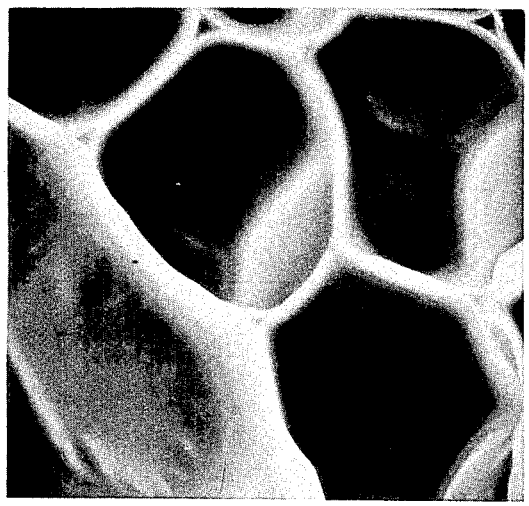
FIGS. 6 to 22 are scanning electron photomicrographs (SEM) showing the cells and cell walls of phenolic foams that were made using phenolic resoles that are representative of the present invention and using phenolic resoles that are illustrative of the present invention. All SEMs are of 400X magnification unless otherwise stated.

The cured foam contained 100 percent closed cells as measured using an air pyconometer according to test ASTM D-2856-70 and had a density of about 3.25 pounds per cubic foot (52 kg/cu. meter). The foam has an initial k factor of 0.135 before equilibration. The SEM of this foam is shown in FIG. 6. This SEM shows that the cell walls of the foam are substantially free of ruptures and perforations and the cell walls are thick.

The k factors of the foam upon aging are set forth in Table I and also illustrate that the phenolic foam entrapped the blowing agent and held the blowing agent, accordingly, the cell walls are thick and substantially free of both perforations and ruptures.

TABLE I

| Aging Period | k Factor |
| --- | --- |
| 10 day | 0.123 |
| 30 days | 0.122 |
| 90 days | 0.113 |
| 120 days | 0.113 |
| 280 days | 0.118 |

EXAMPLE 14

A phenolic resole feed was prepared by mixing 74.6 parts of the phenolic resole prepared as in Example 2 with 2.4 parts of L-7003 silicone surfactant.

A catalyst of anhydrous toluene sulfonic acid/xylene sufonic acid (ULTRA-TX catalyst from WITCO Chemical) was used.

The phenolic resole feed composition, catalyst and a fluorocarbon blowing agent feed containing 6 parts of 1,1,2-trichloro-1,2,2-trifluoroethane, 6 parts of trichlorormonofluoromethane and 1 part of L-7003 silicone surfactant were separately fed to and mixed in a distribution device of a phenolic foam machine as illustrated schematically in FIG. 2.

The phenolic resole feed composition, catalyst, and blowing agent feed composition were kept at temperatures in the ranges, respectively, of 9.4° C. to 12.2° C., 0.5° C. to 2.8° C., and −3° C. to 1.1° C. prior to mixing in the distribution device.

The foamable composition was applied at a temperature of about 30° C. continuously for six hours to a lower facing sheet of aluminum coated cardboard moved by the lower conveyor. An upper facing sheet of the same material and side papers of polyethylene were fed to the machine just ahead of the curing cavity as illustrated in FIGS. 2 and 3.

The relative amounts of resole feed, catalyst, and blowing agent feed in the foamable conposition were determined at eight times during the total six hours and are as reported in the following table.

TABLE II

| Time Number | Total Time Elapsed | Parts Resole Feed | Parts Catalyst | Parts Blowing Agent Feed |
|---|---|---|---|---|
| 1. | 15 mins. | 76 | 12.8 | 11.2 |
| 2. | 45 mins. | 76 | 13.0 | 11.0 |
| 3. | 61 mins. | 76 | 13.0 | 11.0 |
| 4. | 101 mins. | 76 | 13.8 | 10.2 |
| 5. | 170 mins. | 76 | 13.6 | 10.4 |
| 6. | 255 mins. | 76 | 13.8 | 10.2 |
| 7. | 315 mins. | 76 | 13.8 | 10.2 |
| 8. | 360 mins. | 76 | 13.8 | 10.2 |

The foamable composition was applied to the lower facing material and the conveyor speed adjusted such that once the foam had expanded to substantially fill the curing cavity, further expansion was prevented and pressure was generated within the curing cavity.

A pressure measurement, taken in the curing cavity after about every 30 minutes during the run at about ¾ of the way from the entrance of the curing cavity, indicated a gauge pressure generated by the foam within the cavity of 4-7 pounds per square inch. Temperature measurements of the foam just after exiting the curing cavity were taken during four times during the run and ranged from 72° C. to 82° C.

Figure 7:
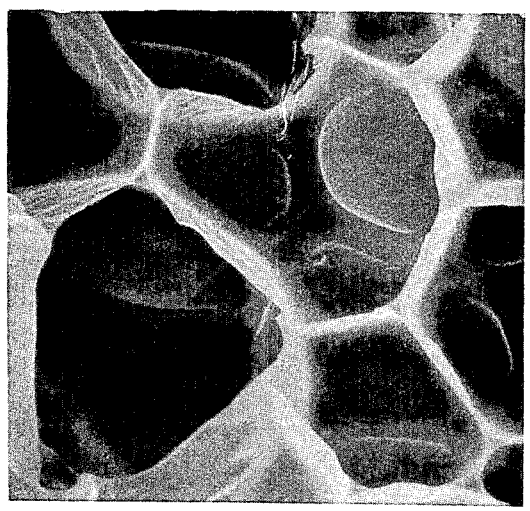

Product foam samples were taken every hour. The initial k factors, k factors after aging, and core densities of the foam samples are shown in Table III. FIG. 7 is a scanning electron photomicrograph of the phenolic foam prepared in this example. The SEM clearly shows that the cell walls are substantially free of cracks, ruptures and perforations. This is also shown by the k factor data in Table III.

TABLE III

| Sample No. | Initial "k" | After 45 Days "k" | Core Density (pcf) |
|---|---|---|---|
| 1 | 0.161 | 0.118 | 2.642 |
| 2 | 0.158 | 0.114 | 2.593 |
| 3 | 0.164 | 0.115 | 2.814 |
| 4 | 0.160 | 0.114 | 2.62 |
| 5 | 0.171 | 0.115 | 2.87 |
| 6 | 0.168 | 0.121 | 2.76 |

Sample number one was tested after a period of one year and was found to still have a k factor of 0.118.

EXAMPLE 15

A phenolic foam was prepared in the laboratory in a pint-size tin can as follows.

Figure 8:
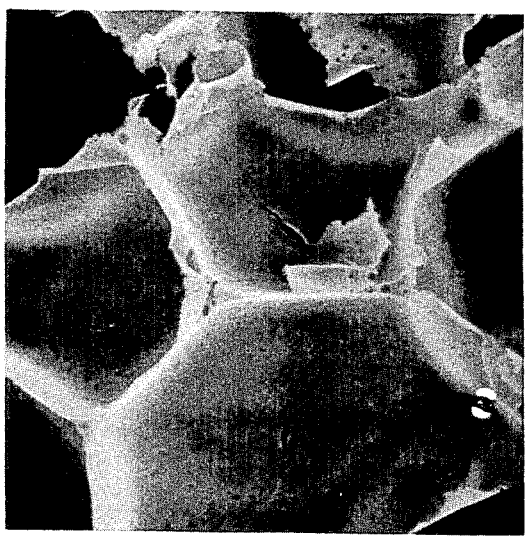

First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-7003). This fluorocarbon blowing agent mixture was put in an ice bath and cooled to 50° F.-55° F. Then 221 grams of a phenolic resole prepared as in Example 1 was mixed with the high speed air mixer with 2.4 parts (8.0 grans) of silicone surfactant L-7003 in the tin can. The fluorocarbon blowing agent/surfactant premix was then mixed with the phenolic resole/surfactant premix. This mixture of phenolic resole, blowing agent and surfactant was cooled in the ice bath to 50° F-55° F. Then 66 grams of a catalyst mixture of phenol sulfonic acid and methane sulfonic acid in a weight ratio of 5/3 containing 33 percent by weight water was weighed into a beaker and cooled to 40° F-45° F. The acid catalyst was then mixed into the can with the phenolic resole, blowing agent and surfactant mixture at high rpm for 10-15 seconds. The can with the foamable composition was placed in a 150° F. oven for four minutes. After removing from the oven, the foam was allowed to stand for 24 hours before cutting samples for evaluation of foam properties. The foam of this example is shown in FIG. 8.

The SEM clearly shows that most of the cell walls are ruptured and contain many perforations. The SEM clearly shows the desirability of preparing the phenolic foam in a substantially closed mold capable of withstanding the pressure exerted by the foaming composition since most of the cell walls of foam are ruptured. The initial k factor of the foam was about 0.22, which also shows that the cell walls are ruptured and/or contain perforations since no fluorocarbon agent was retained in the foam.

EXAMPLE 16

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9⅜"×13"×2".

The mold was coated with a mold release agent and preheated in a 150° F. oven. A piece of dry corrugated cardboard of about 9⅜" by 28" was dried in a 150° F. oven for about 10-15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-5340). This fluorocarbon blowing agent mixture was put in an ice bath and cooled to 50°-66° F. Then 71.6 parts (237.8 grams) of a phenolic resole prepared as in Example 3 was mixed with the high speed air mixer with 2.4 parts (8.0 grams) of silicone surfactant L-5340 and 3 parts (10 grams) of urea. The fluorocarbon blowing agent/surfactant premix was then mixed with the phenolic resole/surfactant premix. This mixture of phenolic resole, blowing agent and surfactant was cooled in the ice bath to 50°-55° F. Then 12 parts (39.8 grams) of an anhydrous aryl sulfonic acid comprising 65 percent by weight toluene sulfonic acid and 35 percent by weight xylene sulfonic acid was weighed into a syringe and cooled to 40°-45° F. The cardboard and mold were removed from the oven. The anhydrous toluene/xylene sulfonic acid mixture was then mixed with the phenolic resole, blowing agent and surfactant mixture at high rpm for 10-15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties.

Figure 9:

The cured foam contained 100 percent closed cells as measured using an air pyconometer according to test ASTM D-2856-70 and had a density of about 3.25 pounds per cubic foot (52 kg/cu. meter). The foam has an initial k factor of 0.14 before equilibration. The SEM of this foam is shown in FIG. 9.

The SEM clearly shows that the cell walls are thick and free from both perforations and ruptures. This is also illustrated by the k factor data which also shows that the fluorocarbon blowing agent was entrapped in the cells.

The k factor of the foam upon aging are set forth in the following table.

| Aging Period | k Factor |
| --- | --- |
| 10 days | 0.117 |
| 30 days | 0.117 |
| 60 days | 0.118 |
| 90 days | 0.114 |
| 150 days | 0.117 |

EXAMPLE 17

A phenolic foam was prepared in accordance with the procedure set forth in Example 16 except the phenolic resole that was used was the phenolic resole prepared as in Example 4.

Figure 10:
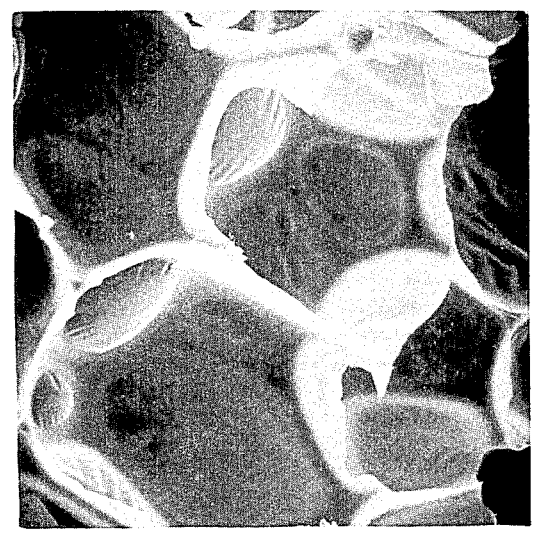

The SEM of this foam is shown as FIG. 10. The SEM shows that the cell walls are thick and free from perforations. The initial k factor of this foam was 0.120.

EXAMPLE 18

A phenolic foam was prepared in accordance with the procedure set forth in Example 16 except the phenolic resole that was used was the phenolic resole of Example 5.

Figure 11:
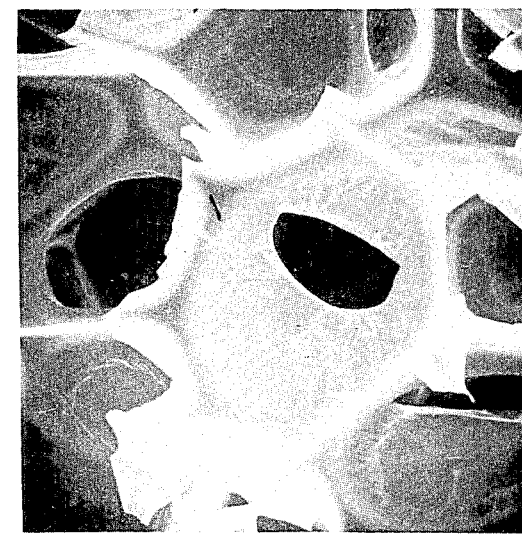

The SEM of this foam is shown as FIG. 11. The SEM shows that many of the cell walls are ruptured and some of the cell walls are thin and cracked. This example illustrates the necessity of having a resole with the molecular weight characteristics of the present invention. This foam had an initial k factor of 0.22.

EXAMPLE 19

A phenolic foam was prepared in accordance wth the procedure set forth in Example 16 except the phenolic resole that was used was the phenolic resole of Example 6.

Figure 12:
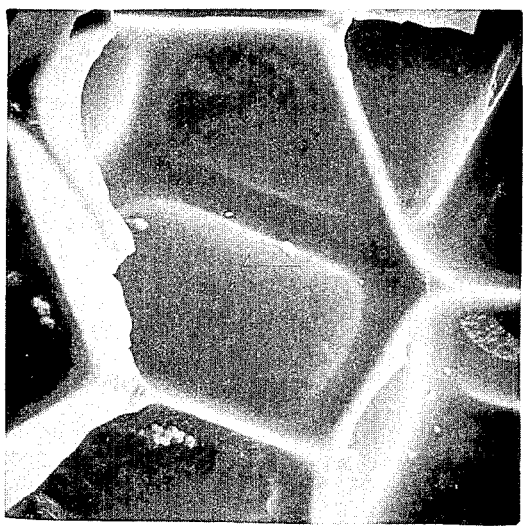

The SEM of this foam is shown as FIG. 12. The SEM shows that the cell walls are substantially free of cracks, ruptures and perforations. The foam had an initial k factor of 0.138 and a k factor after 90 days of 0.138.

EXAMPLE 20

A phenolic foam was prepared in accordance with the procedure set forth in Example 16 except the phenolic resole that was used was the phenolic resole of Example 7.

EXAMPLE 21

Figure 13:
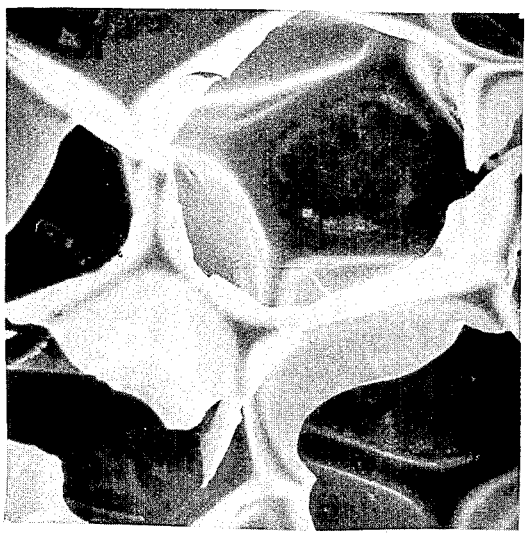

The SEM of this foam is shown as FIG. 13. The SEM shows that the cell walls are substantially free of cracks, ruptures and perforations. The foam had a k factor after 180 days of 0.118 which clearly shows that the foam entrapped the blowing agent.

EXAMPLE 21

A phenolic foam was prepared in accordance with the procedure set forth in Example 16 except the phenolic resole that was used was the phenolic resole of Example 8.

Figure 14:
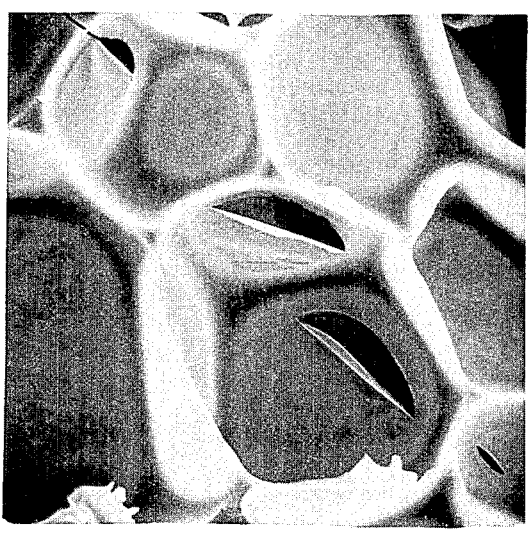

The SEM of this foam is shown as FIG. 14. The SEM shows that many of the cell walls are ruptured or thin and cracked. The foam had an initial k factor of 0.22.

EXAMPLE 22

A phenolic foam was prepared in accordance with the procedure set forth in Example 16 except the phenolic resole that was used was the phenolic resole of Example 9.

Figure 15:
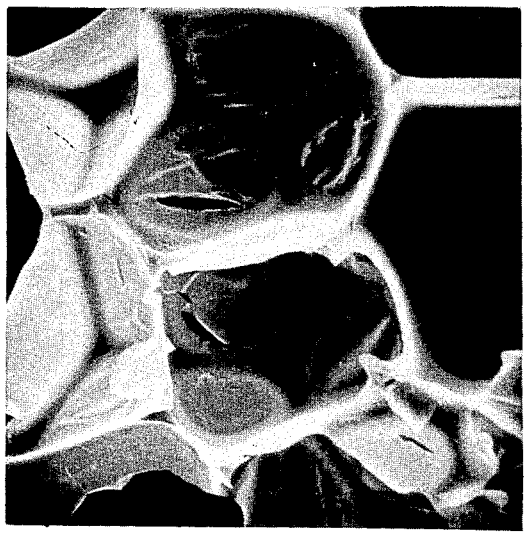

The SEM of this foam is shown as FIG. 15. The SEM shows many of the cell walls are ruptured. The foam had an initial k factor of 0.206 and a k factor after 30 days of 0.224.

EXAMPLE 23

A phenolic foam was prepared in accordance with the procedure set forth in Example 16 except the phenolic resole that was used was the phenolic resole of Example 10.

Figure 16:
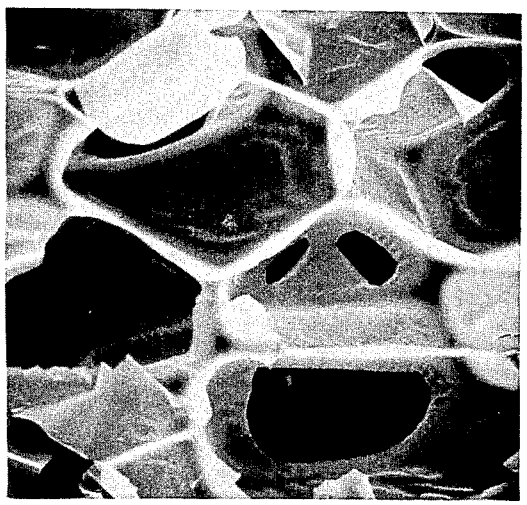

The SEM of this foam is shown as FIG. 16. The SEM shows that many of the cell walls are ruptured even though the foaming was performed in a closed mold capable of withstanding high pressures. This illustrates the necessity of having the required molecular weights and dispersivity in order to make a phenolic foam free of ruptured cell walls. The foam had an initial k factor of 0.22.

EXAMPLE 24

A phenolic foam was prepared in accordance vdth the procedure set forth in Example 16 except the phenolic resole that was used was the phenolic resole of Example 11.

Figure 17:
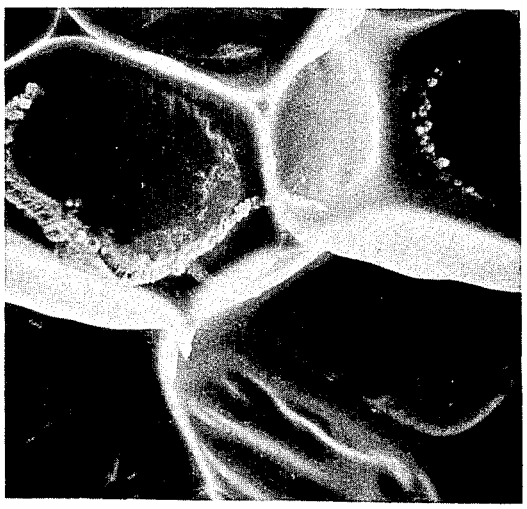

The SEM of this foam is shown as FIG. 17. The SEM shows that the cell walls are substantially free of cracks, ruptures and perforations. The foam had an initial k factor of 0.127 and a k factor after 30 days of 0.118. This example illustrates that the method of preparing the resole is not important so long as the required molecular weights and dispersivity are obtained.

EXAMPLE 25

A phenolic foam was prepared in accordance wth the procedure set forth in Example 16 except the phenolic resole that was used was the phenolic resole of Example 12.

Figure 18:
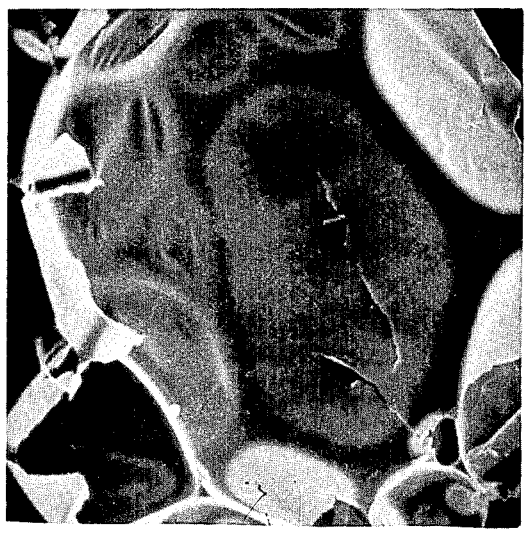

The SEM of this foam is shown as FIG. 18. The SEM shows that most of the cell walls are ruptured. The foam had an initial k factor of 0.250. This example shows the importance of using primarily phenol in preparing the phenolic resole.

EXAMPLE 26

A phenolic resole was prepared in accordance with Example 2 except the reaction was stopped when a bubble viscosity of 80 seconds was achieved. This resole had 15.1 percent water, 3.1 percent formaldehyde, and 3.2 percent phenol. This resole had a weight average molecular weight of 1504, a number average molecular weight of 591, and a dispersivity of 2.55.

A foam was prepared from this resole following the procedures set forth in Example 16.

Figure 19:
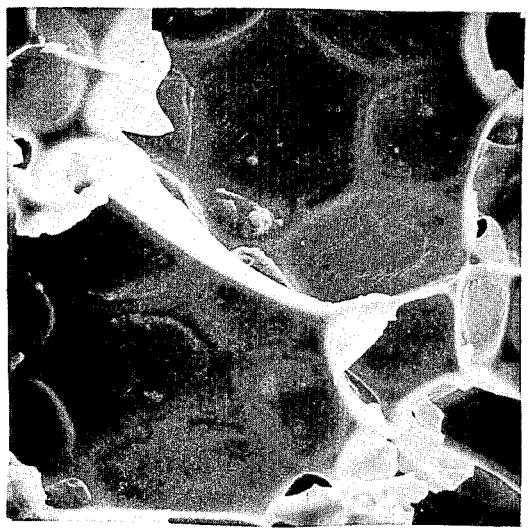

The SEM of this foam is shown as FIG. 19. The SEM shows that the cell walls are free of cracks, ruptures and perforations. This example illustrates the desirability of using the preferred resoles. This foam had an initial k factor of 0.121.

EXAMPLE 27

A phenolic foam was prepared in the laboratory using the laboratory mold illustrated in FIGS. 1A and 1B. The mold was made with ½-inch thick aluminum bars for the sides and ¼-inch thick aluminum plates for the top and bottom and had inside dimensions of 9 ⅜"×13"×2". The phenolic resole used in this example was a commercially available phenolic resole from Georgia Pacific sold as GP-X-2014/945. This resole as received had 7 percent by weight water. An additional 5 percent by weight water was added to give the resole a water content of 12 percent by weight. This resin had a weight average molecular weight of 674, a number average molecular weight of 398.5, and a dispersivity of 1.69.

Figure 20:

The mold was coated with a mold release agent and preheated in a 150° F. oven. A piece of dry corrugated cardboard of about 9 ⅜" by 28" was dried in a 150° C. oven for about 10–15 minutes. While the mold and cardboard were in the oven, the phenolic resin foamable composition was prepared as follows. First, 10 parts (33.2 grams) of a 50/50 by weight blend of Freon 11/Freon 113 (trichloromonofluoromethane/1,1,2-trichloro-1,2,2-trifluoroethane) fluorocarbon blowing agent was premixed with a high speed air mixer (3000 rpm) with 1 part (3.3 grams) of a silicone surfactant (Union Carbide L-7003). This fluorocarbon blowing agent mixture was put in an ice bath and cooled to 50°–55° F. Then 76.6 parts (254.3 grams) of the phenolic resole was mixed with the high speed air mixer with 2.4 parts (8.0 grams) of silicone surfactant L-7003. The fluorocarbon blowing agent/surfactant premix was then mixed with the phenolic resole/surfactant premix. This mixture of phenolic resole, blowing agent and surfactant was cooled in the ice bath to 50°–55° F. Then 10 parts of an anhydrous toluene sulfonic/xylene sulfonic acid mixture (ULTRA-TX acid from WITCO Chemical) was weighed into a syringe and cooled to 40°–45° F. The cardboard and mold were removed fron the oven. The anhydrous aryl sulfonic acid catalyst was then mixed with the phenolic resole, blowing agent and surfactant mixture at high rpm for 10–15 seconds. Then 210 grams of the final phenolic resole foamable composition was immediately poured onto the cardboard in s-shaped fashion as shown in FIG. 1B. The cardboard was folded over the top of the foamable mixture and immediately put into the mold. The mold was closed and all clamps put in place and tightened. The mold with the foamable composition was placed in a 150° F. oven for 4 minutes. After removing from the oven, the foam was removed from the mold and weighed. The foam was allowed to stand for 24 hours before cutting samples for evaluation of foam properties. This foam had a k factor of 0.22. The scanning electron photomicrograph of this phenolic foam is shown in FIG. 20. The SEM shows that the foam has cell walls which are substantially free of perforations. However, the SEM also shows that many of the cell walls are ruptured or are very thin with cracks. This example illustrates the necessity of having higher molecular weights in accordance with the present invention.

EXAMPLE 28

A phenolic foam was prepared in accordance with Example 15 except the resole was prepared in accordance with Example 4 and the ratio of ingredients was as in Example 17.

Figure 21:
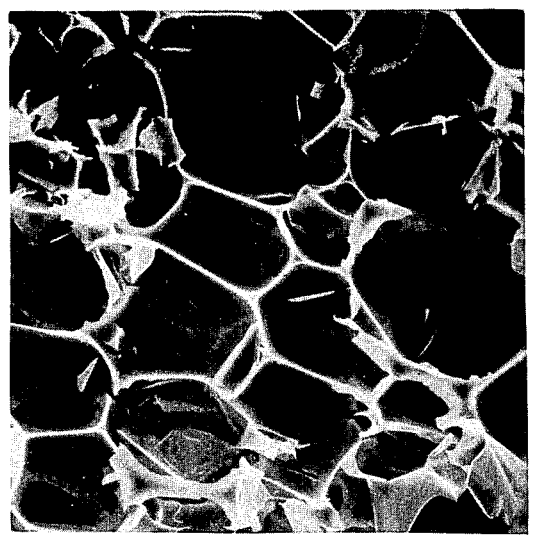
Figure 22:
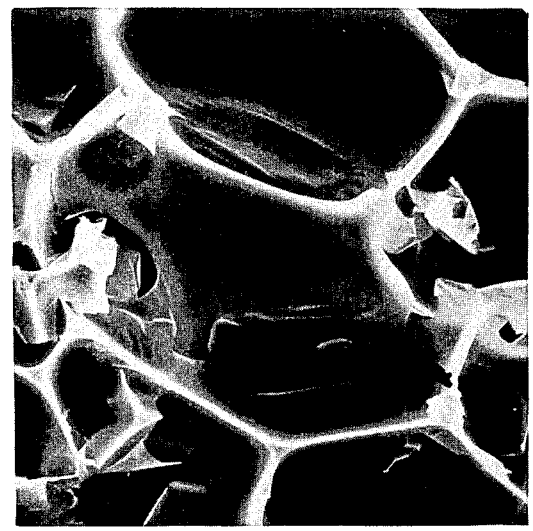

The SEMs of this foan is shown at at 200X as FIG. 21 and at 400X as FIG. 22. These SEMs show that the cell walls are ruptured. This example shows the necessity of having a substantially closed mold capable of withstanding pressures generated by the foaming composition in order to prevent ruptures of the cell walls. A comparison of this SEM with other SEMs, particularly FIGS. 11, 16 and 20, also shows the difference in rupturing caused by lack of pressure and that caused by too hot a resole when pressure is used.

We claim:

1. An improved process for preparing closed cell phenolic foam having entrapped fluorocarbon blowing agent comprising preparing a foamable phenolic resole composition comprising aqueous phenol formaldehyde resole, surfactant, fluorocarbon blowing agent and acid catalyst, and foaming and curing said composition in a substantially closed mold wherein the improvement comprises a phenol formaldehyde resole having a molar ratio of formaldehyde to phenol of from about 1.7:1 to about 2.3:1, a weight average molecular weight greater than about 800, a number average molecular weight greater than about 350, a dispersivity greater than about 1.7 and wherein the content of free formaldehyde and free phenol are each less than 7 percent by weight.

2. An improved process as in claim 1 wherein the weight average molecular weight of the phenol formaldehyde resole is between about 950 and 1500.

3. An improved process as in claim 1 wherein the number average molecular weight of the phenol formaldehyde resole is between about 400 and 600.

4. An improved process for preparing closed cell phenolic foam having entrapped fluorocarbon blowing agent comprising preparing a foamable phenolic resole composition comprising aqueous phenol formaldehyde resole, surfactant, fluorocarbon blowing agent and acid catalyst, and foaming and curing said composition in a substantially closed mold wherein the improvement comprises a phenol formaldehyde resole having a molar ratio of formaldehyde to phenol of from about 1.7:1 to 2.3:1, a weight average molecular weight between about 950 and 1500, a number average molecular weight between about 400 and 600, a dispersivity between about 1.8 and 2.6 and wherein the content of free formaldehyde and free phenol are each less than 7 percent by weight.

5. An improved process as in claim 4 wherein the content of free formaldehyde and free phenol are each less than 4 percent by weight.

6. An improved process for preparing closed cell phenolic foam having entrapped fluorocarbon blowing agent comprising preparing a foamable phenolic resole composition comprising aqueous phenol formaldehyde resole, surfactant, fluorocarbon blowing agent and acid catalyst, and foaming and curing said composition in a substantially closed mold wherein the improvement comprises a phenol formaldehyde resole having a molar ratio of formaldehyde to phenol of from about 1.75:1 to about 2.25:1, a weight average molecular weight greater than about 800, a number average molecular weight greater than about 350, a dispersivity greater than about 1.7 and wherein the content of free formaldehyde and free phenol are each less than 7 percent by weight.

7. An improved process as in claim 6 wherein the weight average molecular weight of the phenol formaldehyde resole is between about 950 and 1500.

8. An improved process as in claim 6 wherein the number average molecular weight of the phenol formaldehyde resole is between about 400 and 600.

9. An improved process for preparing closed cell phenolic foam having entrapped fluorocarbon blowing agent comprising preparing a foamable phenolic resole composition comprising aqueous phenol formaldehyde resole, surfactant, fluorocarbon blowing agent and acid catalyst, and foaming and curing said composition in a substantially closed mold wherein the improvement comprises a phenol formaldehyde resole having a molar ratio of formaldehyde to phenol of from about 1.75:1 to 2.25:1, a weight average molecular weight between about 950 and 1500, a number average molecular weight between about 400 and 600, a dispersitivity between about 1.8 and 2.6 and wherein the content of free formaldehyde and free phenol are each less than 7 percent by weight.

10. An improved process as in claim 9 wherein the content of free formaldehyde and free phenol are each less than 4 percent by weight.

11. An improved process for preparing closed cell phenolic foam having entrapped fluorocarbon blowing agent comprising preparing a foamable phenolic resole composition comprising aqueous phenol formaldehyde resole, surfactant, fluorocarbon blowing agent and acid catalyst, and foaming and curing said composition in a substantially closed mold wherein the improvement comprises a phenol formaldehyde resole having a molar ratio of formaldehyde to phenol of about 2:1, a weight average molecular weight greater than about 800, a number average molecular weight greater than about 350, a dispersivity greater than about 1.7 and wherein the content of free formaldehyde and free phenol are each less than 7 percent by weight.

12. An improved process as in claim 11 wherein the weight average molecular weight of the phenol formaldehyde resole is between about 950 and 1500.

13. An improved process as in claim 11 wherein the number average molecular weight of the phenol formaldehyde resole is between about 400 and 600.

14. An improved process for preparing closed cell phenolic foam having entrapped fluorocarbon blowing agent comprising preparing a foamable phenolic resole composition comprising aqueous phenol formaldehyde resole, surfactant, fluorocarbon blowing agent and acid catalyst, and foaming and curing said composition in a substantially closed mold wherein the improvement comprises a phenol formaldehyde resole having a molar ratio of formaldehyde to phenol of about 2:1, a weight average molecular weight between about 950 and 1500, a number average molecular weight between about 400 and 600, a dispersivity between about 1.8 and 2.6 and wherein the content of free formaldehyde and free phenol are each less than 7 percent by weight.

15. An improved process as in claim 14 wherein the content of free formaldehyde and free phenol are each less than 4 percent by weight.

16. An improved foamable phenolic resole composition for preparing closed cell phenolic foam comprising an aqueous phenol formaldehyde resole, surfactant, blowing agent and acid catalyst wherein the improvement comprises a phenol formaldehyde resole having a molar ratio of formaldehyde to phenol of from about 1.7:1 to about 2.3:1, a weight average molecular weight greater than about 800, a number average molecular weight greater than about 350, a dispersivity greater than about 1.7 and wherein the content of free formaldehyde and free phenol are each less than 7 percent by weight.

17. An improved foamable phenolic resole composition as in claim 16 wherein the weight average molecular weight of the phenol formaldehyde resole is between about 950 and 1500.

18. An improved foamable phenolic resole composition as in claim 16 wherein the number average molecular weight of the phenol formaldehyde resole is between about 400 and 600.

19. An improved foamable phenolic resole composition for preparing closed cell phenolic foam comprising an aqueous phenol formaldehyde resole, surfactant, blowing agent and acid catalyst wherein the improvement comprises a phenol formaldehyde resole having a molar ratio of formaldehyde to phenol of from about 1.7:1 to 2.3:1, a weight average molecular weight between about 950 and 1500, a number average molecular weight between about 400 and 600, a dispersivity between about 1.8 and 2.6 and wherein the content of free formaldehyde and free phenol are each less than 7 percent by weight.

20. An improved foamable phenolic resole composition as in claim 19 wherein the content of free formaldehyde and free phenol are each less than 4 percent by weight.

21. An improved foamable phenolic resole composition for preparing closed cell phenolic foam comprising an aqueous phenol formaldehyde resole, surfactant, blowing agent and acid catalyst wherein the improvement comprises a phenol formaldehyde resole having a molar ratio of formaldehyde to phenol of from about 1.75:1 to 2.25:1, a weight average molecular weight greater than about 800, a number average molecular weight greater than about 350, a dispersivity greater than about 1.7 and wherein the content of free formaldehyde and free phenol are each less than 7 percent by weight.

22. An improved foamable phenolic resole composition as in claim 21 wherein the weight average molecular weight of the phenol formaldehyde resole is between about 950 and 1500.

23. An improved foamable phenolic resole composition as in claim 21 wherein the number average molecular weight of the phenol formaldehyde resole is between about 400 and 600.

24. An improved foamable phenolic resole composition for preparing closed cell phenolic foam comprising an aqueous phenol formaldehyde resole, surfactant, blowing agent and acid catalyst wherein the improvement comprises a phenol formaldehyde resole having a molar ratio of formaldehyde to phenol of from about 1.75:1 to 2.25:1, a weight average molecular weight between about 950 and 1500, a number average molecular weight between about 400 and 600, a dispersivity between about 1.8 and 2.6 and wherein the content of free formaldehyde and free phenol are each less than 7 percent by weight.

25. An improved foamable phenolic resole composition as in claim 24 wherein the content of free formaldehyde and free phenol are each less than 4 percent by weight.

26. An improved foamable phenolic resole composition for preparing closed cell phenolic foam comprising an aqueous phenol formaldehyde resole, surfactant, blowing agent and acid catalyst wherein the improvement comprises a phenol formaldehyde resole having a molar ratio of formaldehyde to phenol of about 2:1, a weight average molecular weight greater than about 800, a number average molecular weight greater than about 350, a dispersivity greater than about 1.7 and wherein the content of free formaldehyde and free phenol are each less than 7 percent by weight.

27. An improved foamable phenolic resole composition as in claim 26 wherein the weight average molecular weight of the phenol formaldehyde resole is between about 950 and 1500.

28. An improved foamable phenolic resole composition as in claim 26 wherein the number average molecular weight of the phenol formaldehyde resole is between about 400 and 600.

29. An improved foamable phenolic resole composition for preparing closed cell phenolic foam comprising an aqueous phenol formaldehyde resole, surfactant, blowing agent and acid catalyst wherein the improvement comprises a phenol formaldehyde resole having a molar ratio of formaldehyde to phenol of about 2:1, a weight average molecular weight between about 950 and 1500, a number average molecular weight between about 400 and 600, a dispersivity between about 1.8 and 2.6 and wherein the content of free formaldehyde and free phenol are each less than 7 percent by weight.

30. An improved foamable phenolic resole composition as in claim 29 wherein the content of free formaldehyde and free phenol are each less than 4 percent by weight.

* * * * *